(12) United States Patent
Gabrys et al.

(10) Patent No.: US 12,278,535 B2
(45) Date of Patent: Apr. 15, 2025

(54) SLOTLESS ROTATING ELECTRIC MACHINE

(71) Applicants: Christopher Gabrys, Reno, NV (US); Timothy Rodgers, Bainbridge Island, WA (US)

(72) Inventors: Christopher Gabrys, Reno, NV (US); Timothy Rodgers, Bainbridge Island, WA (US)

(73) Assignee: Revolution Electric Motor Company, Reno, NV (US)

( * ) Notice: Subject to any disclaimer, the term of this patent is extended or adjusted under 35 U.S.C. 154(b) by 0 days.

(21) Appl. No.: 18/032,852

(22) PCT Filed: Oct. 22, 2021

(86) PCT No.: PCT/US2021/055887
§ 371 (c)(1),
(2) Date: Apr. 20, 2023

(87) PCT Pub. No.: WO2022/087157
PCT Pub. Date: Apr. 28, 2022

(65) Prior Publication Data
US 2023/0387742 A1 Nov. 30, 2023

(51) Int. Cl.
*H02K 3/47* (2006.01)
*H02K 15/061* (2025.01)

(52) U.S. Cl.
CPC .............. *H02K 3/47* (2013.01); *H02K 15/061* (2013.01)

(58) Field of Classification Search
CPC ........ H02K 15/061; H02K 1/27; H02K 15/03; H02K 1/182; H02K 21/22; H02K 3/47;
(Continued)

(56) References Cited

U.S. PATENT DOCUMENTS 3,243,623 A  3/1966 Hart et al.
3,577,851 A  5/1971 Detheridge et al.
(Continued)

FOREIGN PATENT DOCUMENTS

JP  08-126266 A  5/1996
KR  101101676 B1  12/2011

OTHER PUBLICATIONS

IEEE ISIE "A new sensorless communication drive for brushless DC motors and alternators", Cheng-Hu Chen, et al.
(Continued)

*Primary Examiner* — Leda T Pham

(57) ABSTRACT

A slotless rotating electric machine includes a rotor having multiple alternating polarity permanent magnets that drive magnetic flux across a magnetic airgap formed with a slotless ferromagnetic stator. The stator includes a helical backiron formed from a ferromagnetic strip wound edgewise and extending axially, and an adhesive film on the radial airgap surface of the backiron. Armature windings of wire having individually insulated twisted strands diametrically enveloped by an outer serve are adhered to the adhesive film. The adhesive film holds the said serve to the backiron and the serve holds the strands to the adhesive film. The armature windings pressed into the adhesive film as a group after they are formed and adhered while the adhesive cures, such that the wire is both bonded to the radial airgap surface of the helical stator backiron and is additionally partially embedded in the adhesive film.

20 Claims, 16 Drawing Sheets

(58) Field of Classification Search
CPC ............ H02K 15/02; H02K 3/30; H02K 1/06; H02K 3/32; H02K 15/08; H02K 15/0435; H02K 1/14; H02K 11/20; H02K 3/525; H02K 11/30; H02K 3/28; H02K 21/14; H02K 21/24; H02K 1/2793; Y10T 29/49009; Y10T 29/49012

See application file for complete search history.

(56) References Cited

U.S. PATENT DOCUMENTS

| | | | |
|---|---|---|---|
| 3,963,950 | A | 6/1976 | Watanabe et al. |
| 4,392,073 | A | 7/1983 | Rosenberry |
| 5,313,131 | A | 5/1994 | Hibino et al. |
| 5,998,905 | A | 12/1999 | Fougere et al. |
| 6,308,549 | B1 | 10/2001 | Tokizawa et al. |
| 6,525,437 | B1 | 2/2003 | Ozawa et al. |
| 7,042,109 | B2 | 5/2006 | Gabrys |
| 7,977,840 | B2 | 7/2011 | Chu et al. |
| 9,236,783 | B2 * | 1/2016 | Krauth ............... H02K 1/22 |
| 2005/0073210 | A1 | 4/2005 | Drew et al. |
| 2019/0280550 | A1 | 9/2019 | Kay et al. |
| 2020/0313526 | A1 * | 10/2020 | Gabrys ............... H02K 3/28 |
| 2021/0006116 | A1 | 1/2021 | Gabrys |

OTHER PUBLICATIONS

IEEE Transactions on Energy Conversion, vol. 25, No. 3, Sep. 2010 "Sensorless brushless DC motor drive based on the zero-crossing detection of back electromotive force (EMF) from the line voltage difference", P. Damodharan et al.

IEEE Transactions on Magnetics, vol. 44, No. 8, Aug. 2008 "Analysis of relationship between abnormal current and position detection error in sensorless controller for interior permanent-magnet for brushless DC motors", Dong-Myung Lee & Woo-Cheol Lee.

IEEE Transactions on Power Electronics, vol., No., Mar. 2013 "Self-compensation of communication angle based on DC-link current for high-speed brushless DC motors with low inductance", Jiangfen Chang, Wenzhuo Li, & Haitao Li.

IET Electric Power Applications—2018 "Scheme based on buck-converter with three-phase H-bridge combinations for high-speed BLDC motors in aerospace applications", Jiang Feng, Kun Liu, & Qing Wang.

EEE on Industrial Applications—2021 "A fast commutation error connection method for sensorless BLDC motor considering rapidly varying rotor speed", Hao Jin, Gang Liu, Haitau Lee, Baodong Chen, Haifeng Zhang.

Department of Electronics Engineering, Chungnam National University—2011 "A new sensorless drive scheme for a BLDC motor based on the terminal voltage difference", Taeyeon Kim, Chungil Kim, & Joon Lyou.

IEEE Transactions on Power Electronics, vol., No., 2016 "Self-correction of commutation point for high speed sensorless BLDC motor with low induction and nonideal back EMF", Haitao Li, Shiqiang Zheng, & Hongliang Ren.

IET Electric Power Applications—2019 "Commutation error rapid compensation for brushless DC motor based on DC-link ", Gang Liu, Xi Chen, Shiqiang Zheng, & Peiling Cui.

IEEE Transactions on Industrial Informatics—2017 "Rapid self-compensation method of commutation phase error for low inductance BLDC motor", XinXiu Zhou, Xi Chen, Ming Lu, & Fanquan Zeng.

* cited by examiner

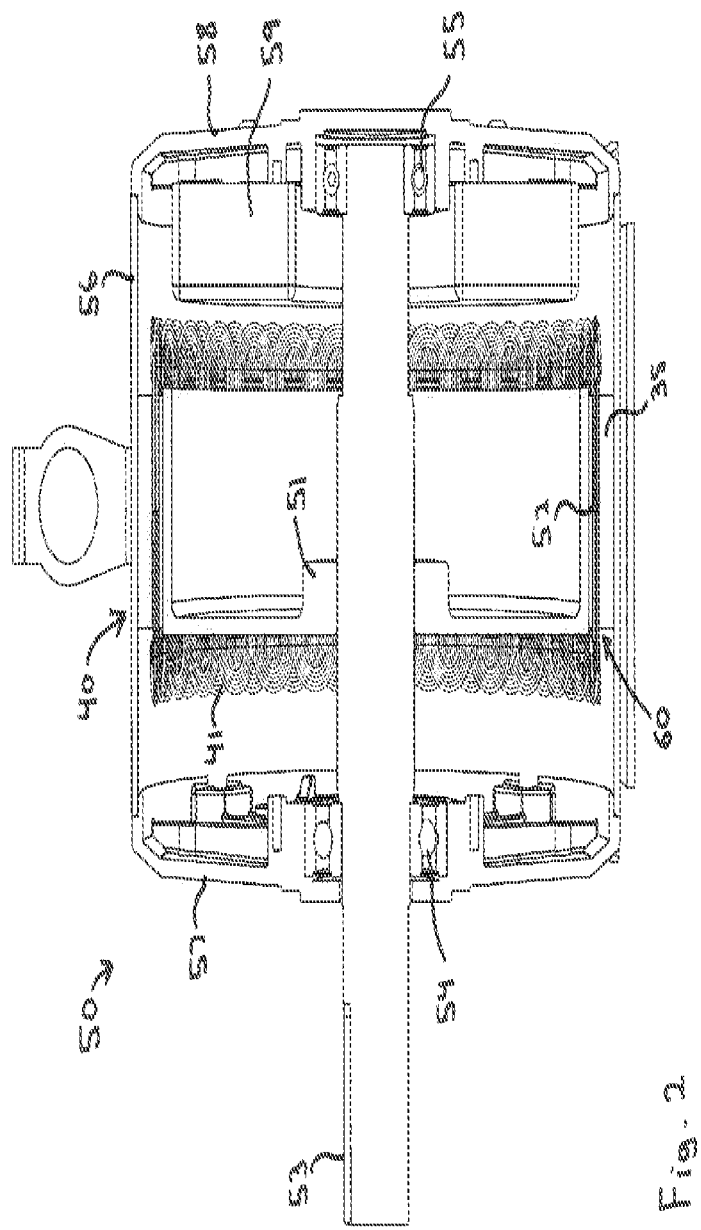

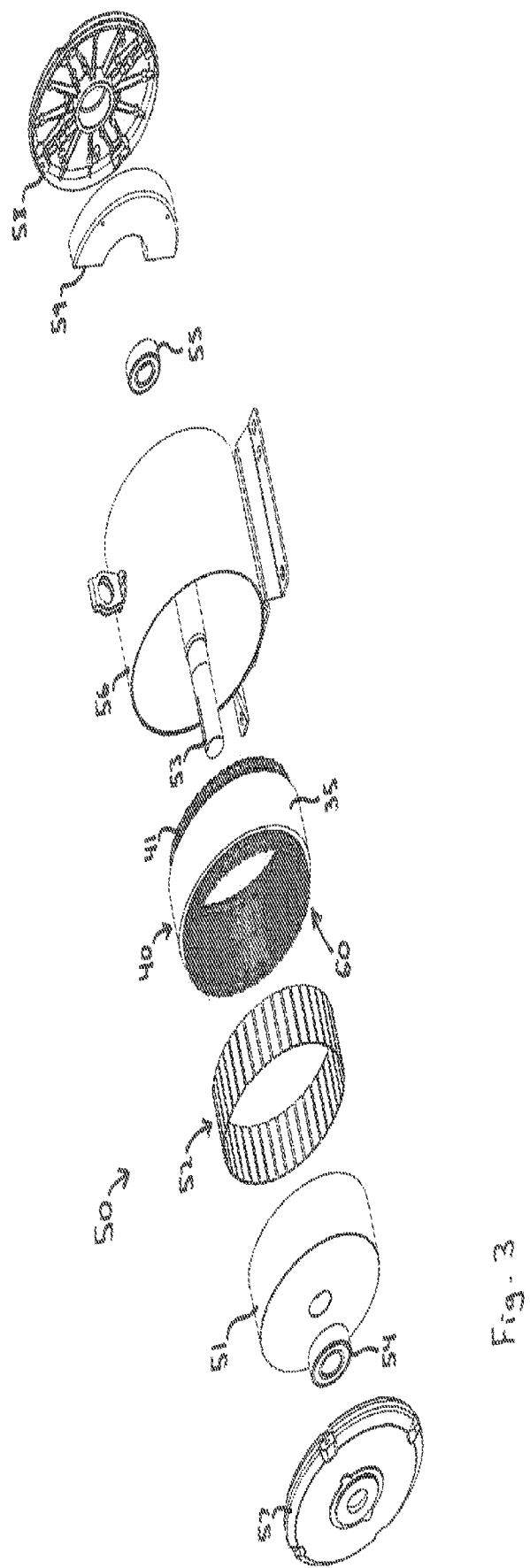

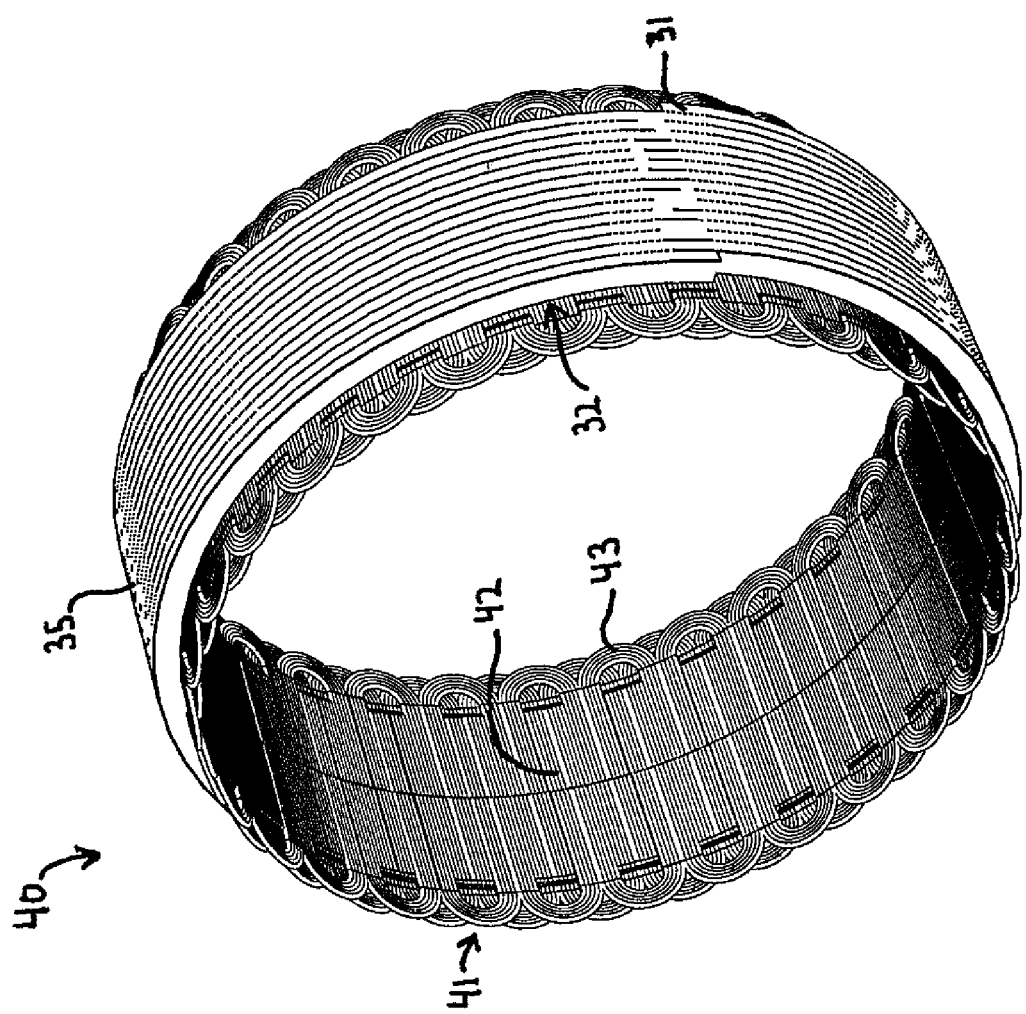

| Parts of Electric Machine | Material Usage | Manufacturing Waste | Origins of Attributes |
|---|---|---|---|
| Ferromagnetic Stator 145 | Minimum | Near Zero | • High pole count, radial thin for conducting flux circumferentially<br>• No slot cutting waste<br>• No lamination stamping waste<br>• Edge roll and cut to length |
| Windings Wire 146 | Minimum | Near Zero | • Only single layer windings in magnetic airgap<br>• End turns located outside magnetic airgap<br>• Cut to length after winding |
| Stator Adhesive 147 | Minimum | Near Zero | • No potting used<br>• Adhesive film die cut to exact backiron dimensions required<br>• Adhesive layer only 0.25 mm thick. |
| Ferromagnetic Rotor 148 | Minimum | Very Low | • High pole count, radial thin for conducting flux circumferentially<br>• Cast to net shape<br>• Only final machining required |
| Rotor Magnets 149 | Minimum | Near Zero | • Minimum magnetic airgap from armature construction<br>• Produced to shape required<br>• Machining waste recycled and reused |

Fig. 15

SLOTLESS ROTATING ELECTRIC MACHINE

This invention pertains to electric machines for electromechanical energy conversion, and more particularly to a slotless rotating electric machine that achieves high efficiency with low material use and minimized manufacturing cost and waste.

BACKGROUND OF THE INVENTION

There is much effort presently being undertaken to develop new electric motors and generators that can provide higher efficiency power conversion between electrical and rotary mechanical energy. Simultaneously, efforts are also focused on reducing the amount of materials utilized and reducing manufacturing costs, while attaining higher efficiency. New electric machines that can achieve higher power conversion efficiency, but are more costly than current traditional machines, are less likely to be well-accepted into the marketplace if at all. The industry-wide goal is to provide higher efficiency and also have lower costs.

Development of new electric motors for achieving higher efficiency is mostly focused on use of synchronous topologies, which require the use of a variable frequency inverter to operate. Use of electronic inverters is also becoming commonplace as a means to increase operational efficiency with all motors by varying the rotational speed, which supports the emergence of new synchronous motors. Permanent magnet synchronous motors can potentially provide the highest possible efficiencies and without cogging vibrations and noise associated with reluctance type motors, depending on the design. Unfortunately to date, high efficiency permanent magnet motors have required too much materials and/or had too time-consuming and wasteful manufacturing.

Accordingly, a new rotating electric machine is needed that can provide high efficiency with lower material use and minimized manufacturing waste. Such an electric machine could enable both reduced operating costs and upfront acquisition cost for motor users, bolstering a high commercial success potential.

SUMMARY OF THE INVENTION

The invention provides a slotless rotating electric machine employing a construction that allows it to operate with increased efficiency while simultaneously reduces material usage and minimizes manufacturing waste. The new electric machines can surpass the latest efficiency standards while weighing as much as 80% less than current conventional motors. In addition to reduced material use and manufacturing waste, the production for the new slotless rotating electric machines is uniquely well-suited for rapid and highly automated manufacturing.

The slotless rotating electric machine comprises a rotor having multiple alternating polarity permanent magnets that drive magnetic flux back and forth across a magnetic airgap formed with a radial airgap surface of a slotless ferromagnetic stator. The slotless ferromagnetic stator comprises a helical stator backiron formed from a ferromagnetic strip wound edgewise and extending axially, and an adhesive film on the radial airgap surface of the helical stator backiron. Armature windings of wire are adhered to the adhesive film on the radial airgap surface wherein the wire comprises individually insulated twisted strands diametrically enveloped by an outer serve. The adhesive film provides holding of the serve to the helical stator backiron with the serve providing holding of the strands to the adhesive film. The armature windings comprise an air core winding pattern formed directly onto the adhesive film in a one wire radial layer that is only one wire deep where inside the magnetic airgap, and having end turns of multiple phases overlapping. The armature windings are pressed into the adhesive film while the adhesive cures, such that the wire is partially embedded in the adhesive film.

Unlike conventional electric machines, the invention uniquely provides high operating efficiency, synergistically with having the low use of materials, and essentially near-zero manufacturing waste. The high operating efficiency is provided through the combined use of permanent magnets for field excitation not requiring power, being slotless construction and without having the pole teeth associated losses, through stator materials minimizing magnetic induced losses and through a windings configuration that minimizes windings resistance and associated resistive power losses.

The low use of materials is likewise achieved through a combination of factors. The electric machine preferably incorporates a very high pole count, typically between 36-60 poles, which is about 10 times higher than most conventional electric machines. The high pole count proportionately reduces the amount of magnetic flux that must be conducted circumferentially between each of the adjacent machine poles. As a result, it dramatically reduces the required radial thicknesses for the rotor and stator ferromagnetic backirons to conduct the flux, typically the largest weight components in electric machines. Lack of pole teeth attached to the stator backiron likewise also eliminates ferromagnetic stator material.

Low use of copper winding material is achieved through armature windings constructed as only a one wire radial layer that is only one wire deep inside the magnetic airgap. We have found that this can be used to minimize the windings length and resulting weight of copper used; providing about a 13 times reduction compared to current conventional electric motors. Typically, designers of electric machines have added more copper weight in the windings in order to achieve higher efficiency. The approach of the new slotless electric machines of reducing the amount of copper in the windings is the opposite. It is contrary to the established conventions known in the art. However, we have surprisingly found that for slotless electric machines, it is not necessarily the total amount of copper that bolsters performance. Instead, performance is highly related to the volume of copper windings per the total magnetic airgap volume which is of critical importance. We have found that a higher copper-density in the airgap can be used to actually reduce the amount of copper needed in an electric machine for achieving high performance. The new slotless electric machine uniquely does not occupy airgap space with a significant volume of adhesive, potting, or other windings support forms. The new electric machines achieve a very high copper density resulting in a substantially reduced amount of copper for the windings, while simultaneously providing a very high operating efficiency.

Low use of magnet material is achieved also through the windings construction of being only one wire deep inside the magnetic airgap and through non-potted or non-molded construction. Compared with other slotless electric machines having multiple windings layers in the magnetic airgap and using molded or potting material that both take up magnetic airgap space, the new electric machine minimizes the required magnetic airgap. A smaller magnetic airgap reduces the amount of magnet material required to drive magnetic flux across it for a given flux density.

Low use of polymer adhesive is achieved through the unique stator construction where the windings are adhered in place by a thin adhesive film, typically less than 0.015" (0.38 mm) thick. This is opposed to other conventional slotless electric machines that are assembled and windings held together by material-inefficient molding using a great many times more adhesive. No fiberglass polymer composite forms for wrapping the windings on are utilized either.

The low manufacturing waste is also achieved through a combination of factors. The production of the ferromagnetic stator backiron is provided by edge rolling slotless ferromagnetic strip into an axially-extending helix. There is no slot cutting waste. There is no lamination stamping waste, such as the center diameter that would be removed by punching for conventional stamping and stacking manufacture, and where about 90% of the lamination material would have to be removed and discarded or recycled. In contrast, there is no waste in manufacturing the stator backiron, as the ferromagnetic strip of a preset width is rolled about a mandrel of the design diameter and cut when the helical reaches the required stator length.

The low polymer adhesive waste is achieved through the windings being adhered to the thin layer of adhesive film. The adhesive film is produced as die cut to an exact shape and size strip that is applied to the radial magnetic airgap surface of the stator backiron prior to the windings pattern being applied. There is no molding adhesive resin waste loss from mixing, injecting, or tooling cleanup. There is no resin dip tank impregnation adhesive waste losses. All of these factors together support the ability of the new slotless electric machines to provide high efficiency with lower material use and minimized manufacturing waste.

The unique manufacturing process utilized for new electric machine's stators facilitates the achievement of the benefits of the invention. The windings are held to the slotless ferromagnetic stator backiron by different means at the different times/steps during the stator assembly process. In a further embodiment, the slotless ferromagnetic stator is adapted to hold the armature windings in the air core winding pattern onto the helical stator backiron by adhesion to the adhesive film in B-stage condition when the air core winding pattern is formed, then by applied radial pressure to the armature windings against the helical stator backiron while during transition of the adhesive film from B-stage condition to C-stage condition, and by adhesion to the film adhesive in C-stage condition in operation of the slotless rotating electric machine. During the winding step, the adhesive film in the B-stage condition preferably has a very high level of tackiness which cooperates the highly flexible stranded wires to accurately and rigidly hold the winding pattern later required for torque generation in operation. However in B-stage condition, the adhesion strength is insufficient for reliable electric machine operation. The adhesive film bonding strength to the wires must be increased through additional curing to C-stage condition. The transition can be completed at the temperature of winding, however we have found that the time required is exceedingly too long for economical production. We have found that it is preferable for higher rate manufacturing production to increase the temperature of the film adhesive after winding to allow for rapid transitioning to C-stage condition. However, increasing the temperature results in development of significant problems. These problems would likely make it undesirable solution for persons of ordinary skill in the art. The transition will inadvertently cause the adhesive to lose tack as it becomes more liquid. As a result, the winding pattern will be lost as the wires would be free to move. Applied radial pressure to the armature windings against the stator backiron is used to hold the winding pattern which was already established, while during the transition to C-stage condition. After the adhesive is in C-stage condition, the pressure is removed and the accurate winding pattern is now held with high strength to provide reliable operation of the electric motor or generator.

For adhesives, A-stage condition means the components of the adhesive have been mixed but the chemical reaction has not started or sufficiently progressed. B-stage condition means that the components of the adhesive have been mixed and the chemical reaction has started, and the material has thickened and is tacky. It is typically in most cases less than 10% cured. C-stage condition means that the adhesive is sufficiently fully cured, or has reached a high percentage of cross-linking/full strength potential. Alternately and practically in accordance with the invention, C-stage condition means that it has a high enough level of cure that it posses sufficient strength to hold the windings in place for the reliable operation of the new electric machines.

The radial pressure is preferably applied through the installation of tooling to the stator backirons after winding, solely for the period of transitioning. The added use of tooling to speed the full curing time of the of the already adhered windings to the stator backiron adds significant costs from required a individual tooling per motor, tooling installation and removal time during the process. It would be contrary to conventions of ordinary persons in the art to add the deficiencies of using tooling to a manufacturing process, especially when the windings are already adhered and held in the winding pattern to the stator backiron without any tooling required. However, we have found that the savings through increased curing speed as well as increased structure outweighs the added costs associated with the use of individual tooling for applying radial pressure for during the transition of the film adhesive to C-stage condition. We have found that such tooling can be expensively constructed as well as rapidly installed and removed, as will be shown.

The adhesion strength to resist forces on the windings during operation comes from the level of cure of the adhesive film as well as the area of contact between the wires and adhesive. In yet an additional embodiment, the adhesive film is flowed partially up the sides of the wire in the direction away from the helical stator backiron and towards the rotor where located inside the magnetic airgap. This is accomplished during the transitioning of the adhesive film from B-stage to C-stage condition by controlling the adhesive flow through the adhesive viscosity from the curing schedule and the level of applied radial pressure to the windings against the stator backiron. In some cases, the adhesive may flow up as much as 50% of the diameter of the wire in the radial direction towards the rotor, depending on the electric machine design and wire size. This can provide an enormous increase in holding force to the windings in operation of the slotless rotating electric machines, and many times what is required. If the film adhesive were alternatively transitioned to C-stage at the lower temperature of winding, and additionally no radial pressure was applied during the transition, the windings would only be bonded on the airgap surface of the stator backiron. The film adhesive would not be additionally flowed up the sides of the wires and the desired high holding force of the windings would also not be achieved. The adhesive film flow preferably does not include to the side of said wire facing the rotor opposite said said radial airgap surface of said helical stator backiron.

This would provide not additional structural benefit and would undesirably reduce the mechanical clearance between rotor and stator.

One critical parameter in design and manufacturing of electric motors and generators is providing electrical insulation sufficient for reliable long term operation. This translates particularly to the dielectric strength both between adjacent winding turns, and also the dielectric strength between windings and ground or ferromagnetic stator supporting the windings. For the slotless electric machines in accordance with the invention, adhesive flow is promoted through the transition from B-stage to C-stage condition and applied radial pressure. Too much flow can easily cause the round wires to migrate the peak contact points all the way through the adhesive film and in direct contact with the ferromagnetic stator. The result would be an undesirably reduced electrical insulation between the windings and ground. In further embodiments, the adhesive film comprises an internal carrier that maintains a minimum dielectric strength between the wires and the helical stator backiron where located in the magnetic airgap. The carrier prevents complete adhesive squeeze-out that could otherwise occur at the peak contact points of the wires. In a preferred configuration, the carrier comprises a fabric. One such type of fabric is a knit construction.

Another critical parameter in electric machine construction is the providing of heat transfer from the windings to the ferromagnetic stator backiron for dissipation, and maintaining cool operating temperatures with long insulation life. Typical electrical machines utilize many layers of winding turns and all the layers must be in good thermal contact with each other such that each layer can conduct generated heat serially to the stator backiron. The less number of winding layers, the easier it is for providing heat transfer from inner layers for effective dissipation and cooler operating temperatures. In an additional embodiment, each the wire in the magnetic airgap is in direct heat conduction to the adhesive film and the adhesive film is in direct heat conduction to the helical stator backiron. This construction need not rely on many layers or winding turns having good thermal contact with each other, because each winding turn is in excellent thermal contact directly by itself with the stator backiron. It provides extremely efficient thermal management with cool operating temperatures for the armature windings through dissipation. Unlike conventional electric machines, the windings also need not be impregnated. Impregnation steps, time, associated costs and resulting manufacturing waste are eliminated. In a further embodiment, the strands of the wire are widely unimpregnated in locations inside magnetic airgap. The end turns of the windings are not subjected to significant electromagnetic induced forces and are preferably located outside the magnetic airgap and not in contact with the adhesive film. Accordingly, the wire may comprise a relatively porous bundle of strands at locations outside the magnetic airgap. Although conventional vacuum pressure impregnation could be added as a final extra step, it is not necessary.

In another embodiment, the slotless rotating electric machine comprises a rotor having multiple alternating polarity permanent magnets that drive magnetic flux back and forth across a magnetic airgap formed with a radial airgap surface of a slotless ferromagnetic stator. The slotless ferromagnetic stator comprises a stator backiron ring formed from ferromagnetic material and an adhesive film on the airgap surface of the stator backiron ring. Armature windings of wire are adhered to the adhesive film on the airgap surface wherein the wire comprises individually insulated twisted strands. The armature windings comprise an air core winding pattern formed directly onto the adhesive film. The armature windings are pressured against the stator backiron ring with heat, imparting the armature windings to be secured in the air core winding pattern formed, with the adhesive film flowed partially up the sides of the wire in the direction away from the stator backiron ring and towards the rotor at locations inside the magnetic airgap. The flowed adhesive provides increased resistance to force on the armature windings. It should be noted that the construction of individually insulated smaller diameter strands precludes development of significant eddy current losses for achieving high efficiency. Further, the twisting additionally precludes losses from development of circulating currents between strands, and it holds the strands together.

The slotless rotating electric machine typically comprises a radial gap configuration with the film adhesive and armature windings applied to a radial airgap surface of the stator backiron ring for the highest performance. However, the electrical machines in accordance with the invention could also utilize an axial gap configuration, with a loss-mitigating axial gap stator backiron and film adhesive and armature windings applied to an axial gap surface of the stator backiron ring. Such axial gap stator backiron rings can be constructed from spiral wound ferromagnetic strip or a powdered iron alloy ring. Axial gap versions typically have lower performance, and can generate undesirable unbalanced bearing loads, both making them less preferable.

The slotless ferromagnetic stator is adapted to hold the armature windings in the air core winding pattern onto the stator backiron ring by adhesion to the adhesive film in B-stage condition when the air core winding pattern is formed, by applied radial pressure to the armature windings against the helical stator backiron while during transition of the adhesive film from B-stage condition to C-stage condition, and by adhesion to the film adhesive in C-stage condition in operation of the slotless rotating electric machine. In an additional embodiment, to maintain the winding pattern for the transition to high adhesion strength, the radial pressure is preferably applied prior to the adhesive film reaching the maximum curing temperature during the transition to the C-stage condition. More preferably, it is provided at even much lower temperature before significant loss of tack of the adhesive film, such that the accurate winding pattern is maintained.

Prior slotless electric machines have utilized molded or encapsulated polymer resin armature construction to hold the windings integrity, pattern and shape. That is not required in accordance with the invention because the windings are held directly to the stator backiron as formed/assembled. Accordingly, in another embodiment, the armature windings are unencapsulated by molded adhesive at locations inside the magnetic airgap. Without an encapsulating adhesive, the wire may additionally comprise a serve of dielectric material helically wrapped around the strands wherein the adhesive film holds the wire to the stator backiron ring and the serve holds the strands to the adhesive film.

In additional embodiments, the slotless rotating electric machine comprises a rotor having multiple poles that drive magnetic flux across a magnetic airgap formed with a radial airgap surface of a slotless ferromagnetic stator. The slotless ferromagnetic stator is formed as a helical stator backiron of a ferromagnetic strip wound edgewise and extending axially. An adhesive film is installed on the radial airgap surface of the helical stator backiron. Armature windings of wire are adhered to the adhesive film on the radial airgap surface wherein the wire comprises individually insulated twisted strands diametrically enveloped by an outer serve. The adhesive film holds the serve to the helical stator backiron with the serve holds the strands to the adhesive film. Armature windings are applied in an air core winding pattern onto the adhesive film in a one wire radial layer that is only one wire deep where inside the magnetic airgap, and with end turns of multiple phases overlapping. The air core winding pattern is secured to the helical stator backiron by the adhesive film flowed partially up the sides of the wire in the direction away from the helical stator backiron and towards the rotor at locations inside the magnetic airgap. The flowed adhesive imparts increased resistance to force on the armature windings. As mentioned previously, the invention allows for armature construction without multiple layers, simplifying manufacturing, as well as improving thermal management and heat transfer from the windings to the stator backiron.

The flowing of the adhesive occurs during the transitioning of the adhesive film from B-stage to C-stage condition. This transition preferably occurs with applied radial pressure against the windings. The applied radial pressure from temporary tooling can tend to deform the wire comprised of strands enveloped by an outer serve, to be radially compressed and radially thinner. We have surprisingly found an additional benefit which is that the curing of the adhesive film (the transitioning of the adhesive from B-stage to C-stage condition) with the wires in deformed state, can maintain the wires in the compressed state even after applied radial pressure is removed. This benefit is due to the bonding to the serve that occurs during the compression under applied radial pressure to the windings and the flattening of the wire. Compressed thinner windings allow for a radially smaller required magnetic airgap, and higher electric machine efficiency with less required permanent magnet material usage. Accordingly, in yet a further embodiment, the adhesive film flow partially up the sides of the wire and cured to the serve holds the wire in a compressed state from round, imparting a reduced radial thickness of the armature windings inside the magnetic airgap.

DESCRIPTION OF THE DRAWINGS

The invention and its many advantages and features will become better understood upon reading the following detailed description of the preferred embodiments in conjunction with the following drawings, wherein:

FIG. 2 is an cut-away side view of the slotless rotating electric machine shown in FIG. 1.

FIG. 3 is an exploded isometric view of the slotless rotating electric machine shown in FIG. 1.

FIG. 12 is an isometric view of the complete wound and cured stator used in the slotless rotating electric machine shown in FIG. 3.

FIG. 15 is a table of materials use and manufacturing waste for producing slotless rotating electric machines in accordance with the invention.

DESCRIPTION OF THE PREFERRED EMBODIMENT

Figure 1:
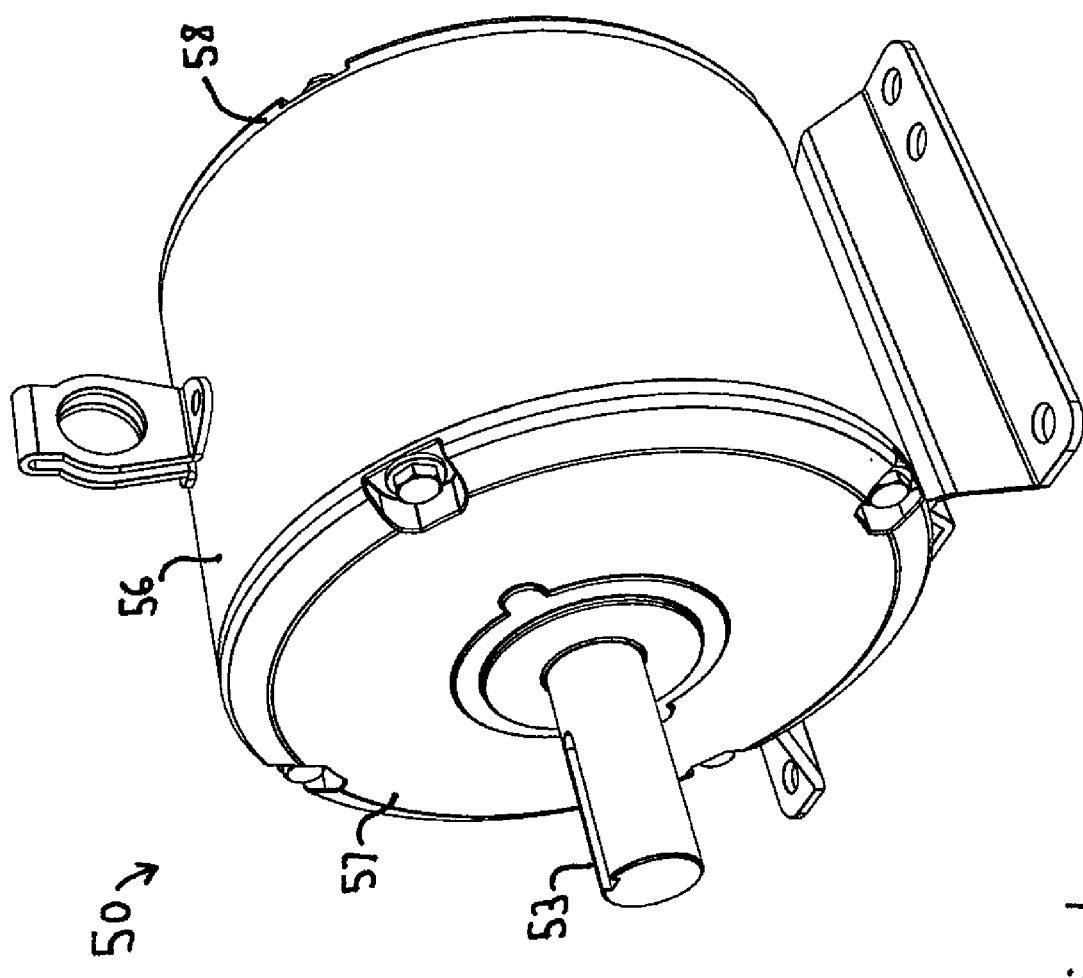
FIG. 1 is an isometric view of a slotless rotating electric machine in accordance with the invention.

Turning to the drawings, wherein like reference characters designate identical or corresponding parts, an isometric view drawing of a slotless rotating electric machine in accordance with the invention is shown in FIG. 1. From the outside, the slotless rotating electric machine looks much like an ordinary motor-generator. The slotless rotating electric machine 50 drives a shaft 53 for rotation and has outer housing 56, and housing endplates 57, 58. However, because of the high pole count (typically preferred to be between 36-60 poles) of the electric machine 50 and other factors, the length of the outer housing 56 can be substantially reduced from a comparable rated conventional electric machine.

An cut-away side view drawing of the slotless rotating electric machine shown in FIG. 1 is shown in FIG. 2. The slotless rotating electric machine 50 is shown as an inner rotor with outer stator topology having windings bonded directly to an inner radial airgap surface of the slotless stator backiron for torque transfer. Alternatively in accordance with the invention, a slotless electrical machine could employ an outer stator with inner rotor topology having windings bonded directly to an outer radial airgap surface of a slotless stator backiron for torque transfer. The slotless rotating electric machine 50 comprises a stator 40 with a slotless edge wound helical laminated electrical steel backiron 35 having wire windings 41 formed on to and bonded to the inner diameter. Directly inside the windings 41 across a magnetic airgap 60 is the rotor 51 with radially alternating polarity permanent magnets 52 fastened to the radially outside surface of the rotor. The magnets 52 drive magnetic flux back and forth radially across the magnetic airgap 60 through the windings 41 and circumferentially through the slotless stator backiron 35. The rotor 51 is connected to a center shaft 53 which is journaled by bearings 54, 55. The bearings 54, 55 are supported by housing end plates 57, 58 coupled together by an outer container 56. An electronic variable speed drive 59, such as that shown in U.S. patent application Ser. No. 16/408,315, provides synchronous power to the windings 41.

An exploded isometric view drawing of the slotless rotating electric machine of FIG. 1 is shown in FIG. 3. The slotless rotating electric machine 50 is comprised of stator 40 with a slotless edge wound helical laminated stator backiron 35 of electrical steel. Windings 41 are bonded to the inner diameter of the stator backiron 35 though an adhesive film, not shown. The windings 41 are made with wire comprised of individually insulated twisted strands diametrically enveloped by an outer serve. Radially inside the stator 40 is the rotor 51 onto which an array of alternating polarity permanent magnets 52 is attached. The array of magnets 51 drive magnetic flux across a radial magnetic airgap 60, radially through the windings 41 and circumferentially through the stator backiron 35 in the operation of the slotless rotating electric machine 50. The rotor 51 is attached to a center shaft 53 which is journaled for rotation between bearings 54, 55. The bearings 54, 55 are supported by housing endplates 57, 58 which are coupled together by an outer housing container 56. The outside of the stator 40 is rigidly supported by the inside of the outer housing container 56. An electronic variable speed drive 59 converts supply powered into synchronous power with the back emf of the slotless rotating electric machine 50 to drive the rotor 51 in rotation as a motor. If the electric machine 50 is operated as a generator, no electronic drive 59 is required.

Figure 4A:
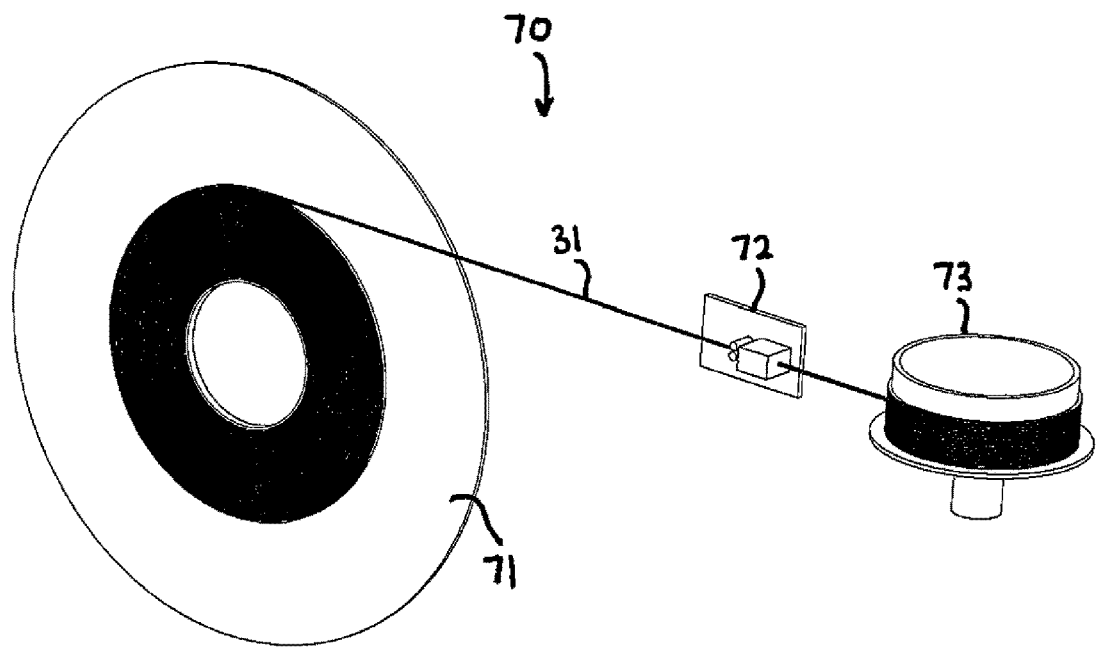
FIG. 4A is a schematic isometric view of the stator backiron manufacturing process used for the slotless rotating electric machine shown in FIG. 3.
Figure 4B:
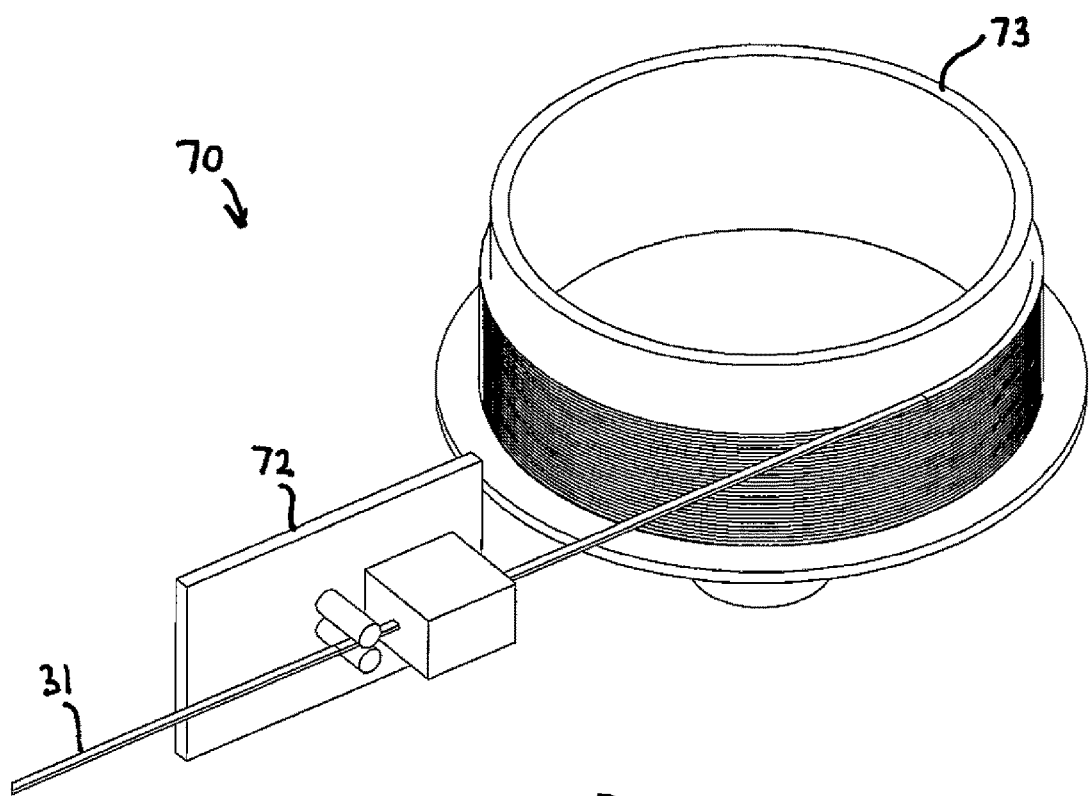
FIG. 4B is an up-close isometric view of the stator backiron manufacturing process shown in FIG. 4A.

A schematic drawing of the stator backiron manufacturing process used for the slotless rotating electric machine of FIG. 3 is shown in FIGS. 4A and 4B. In the edge winding process 70, the stator backiron 35 is formed by winding electrical steel strip 31 edgewise into an axially extending helical. The strip 31 is edge rolled through a payout head 72 and around mandrel 73 to form a helical laminated slotless backiron 35. The electrical steel strip 31 has electrical insulation on at least one of the wide side surfaces, or more preferably on both sides, such that each layer of the backiron lamination is locally axially electrically insulated between each other. For electric machines with number of poles between 36-60 poles and with rotational speed of 3600 rpm, a typical desired thickness of the strip 31 is about 0.010" (0.25 mm) to preclude significant stator backiron core losses. The width of the strip 31 is set to conduct the magnetic flux circumferentially between adjacent magnet poles 52 with a desired flux density and is a function of the number of poles and the size of the electric machine 50. In the edge winding process 70, the mandrel 73 has a diameter similar to the final inner diameter of the stator backiron 35. The mandrel 73 rotates and pulls electrical steel strip 31 from a supply spool 71 and winds the strip 31 about its edge to produce a helical extending axially as the stator backiron 35. The strip 31 is cut when sufficient length is deposited on the mandrel 73.

Figure 5:
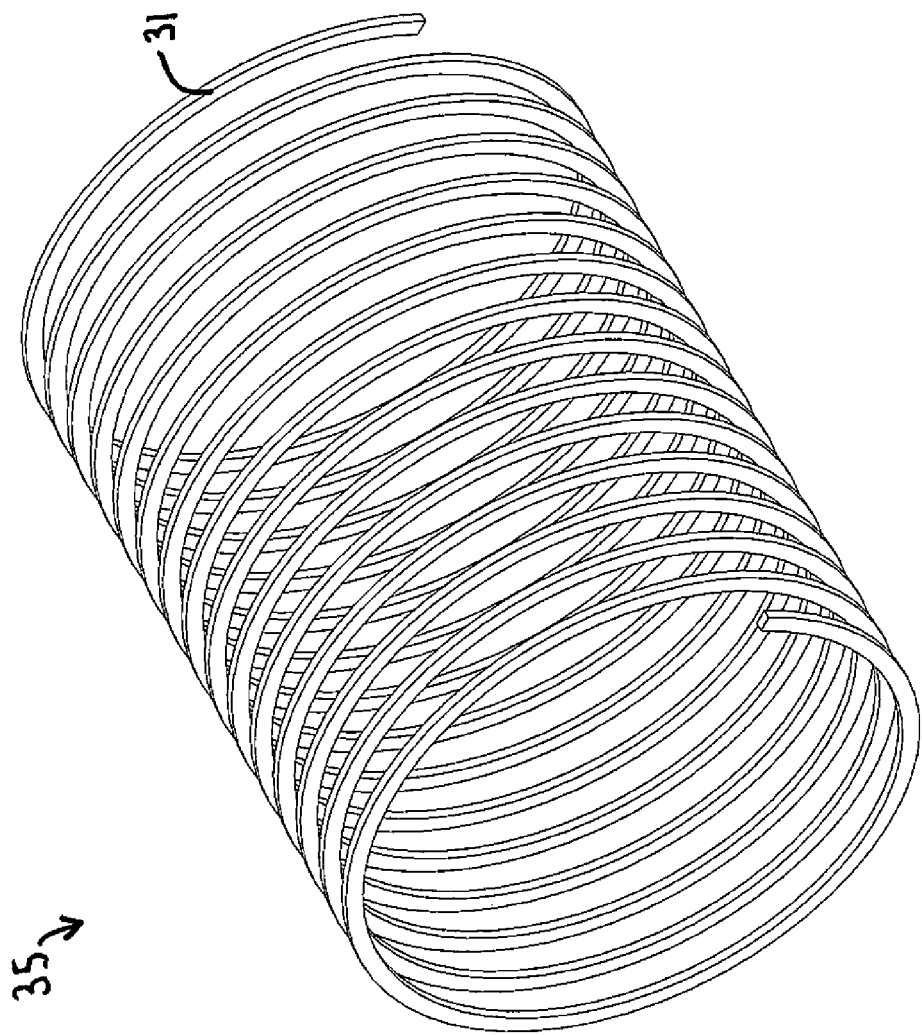
FIG. 5 is a stretched-open isometric view of the stator backiron used in the slotless rotating electric machine shown in FIG. 3.

A stretched-open isometric view of the stator backiron used in the slotless rotating electric machine of FIG. 3 is shown in FIG. 5. After the edge winding process 70, the stator backiron 35 comprises an edge wound helical from electrical steel strip 31. The stator backiron 35 has the desired inner and outer diameter for use in the slotless electrical machine 50 to conduct magnetic flux circumferentially between magnet poles 52 and with axial lamination thickness to mitigate significant magnetic induced losses for the material used and electrical machine characteristics. The stator backiron 35 is shown stretched-open to illustrate the structure.

Figure 6:
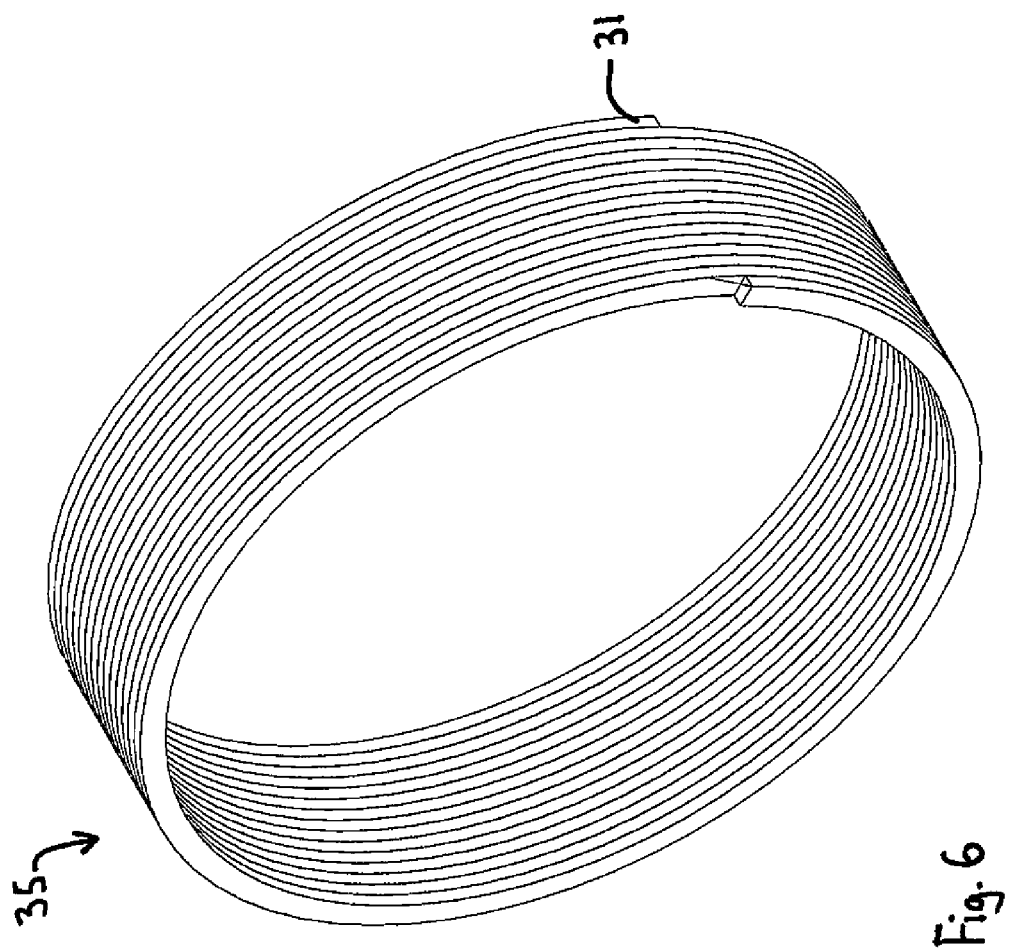
FIG. 6 is an isometric view of the stator backiron used in the slotless rotating electric machine shown in FIG. 3.

An isometric view of the stator backiron used in the slotless rotating electric machine of FIG. 3 is shown in FIG. 6. In operation in the slotless electrical machine 50, the stator backiron 35 is axially unitary with lamination strip layers 31 lying axially adjacent together. The helical layers of the ferromagnetic strip 31 may be held axially compressed by mechanical clamping. Alternatively, the layers of the ferromagnetic strip 31 may be bonded by application of an insulating bonding agent and heating under pressure. The slotless backiron 35 can be formed from any ferromagnetic material that that can conduct magnetic flux circumferentially between magnet poles 52 while imparting low magnetic induced losses at the fundamental operating frequency of the electric machine 50. For an example, a 42 pole electric machine operating at 3600 rpm has the fundamental frequency is 1260 Hz. A common material is thin gauge electrical steel. For the higher efficiency electrical machines, the lamination strip 31 may also be formed from amorphous metal also known as metallic glass. Amorphous metals allow a substantial further reduction in magnetic induced losses in the stator backiron 35 over conventional non-oriented electrical steels. They also provide extremely high magnetic permeability, inherent insulating oxide surface and a square hysteresis loop. One such low cost amorphous metal is $Fe_{80}B_{11}Si_9$.

Figure 7:
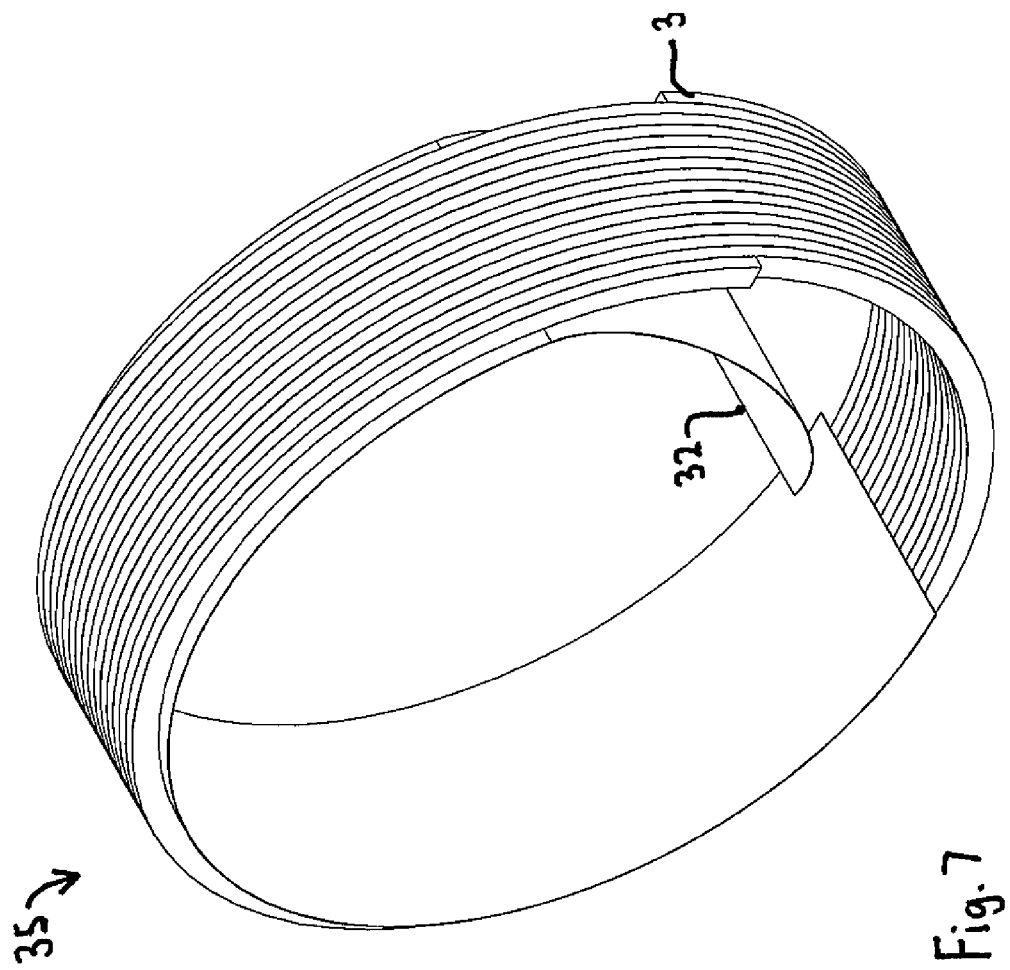
FIG. 7 is an isometric view of the adhesive film being applied to the stator backiron used in the slotless rotating electric machine shown in FIG. 3.

An isometric view of the adhesive film being applied to the stator backiron used in the slotless rotating electric machine of FIG. 3 is shown in FIG. 7. The 0.010" (0.25 mm) axial thickness strip 31 of non-grain oriented electrical steel is edge wound and bonded together to form the helical stator backiron 35. Die cut adhesive film 32 is applied to the inner diameter of the stator backiron 35. B-stage condition adhesive film is typically produced by heating A-stage resin in a film, partially curing it and then cooling to slow or stop the reaction and become a thickened and tacky film. It is preferred to apply a commercially available premanufactured structural adhesive film 32 that is already in B-stage condition to the stator backiron 35 for the numerous substantial benefits including: ease of use, production speed, reliability, consistency, and no waste or mess. One such preferred adhesive film is 3M Scotch-Weld structural adhesive film AF 163-2K. However, it is alternatively possible to apply A-stage condition adhesive as a thin layer to the stator surface, and then heat and cool to bring it to B-stage condition with tackiness directly on the stator to form the adhesive film. This method would not enjoy the numerous benefits of using premanufactured adhesive film and would generally not be preferable.

Figure 8:
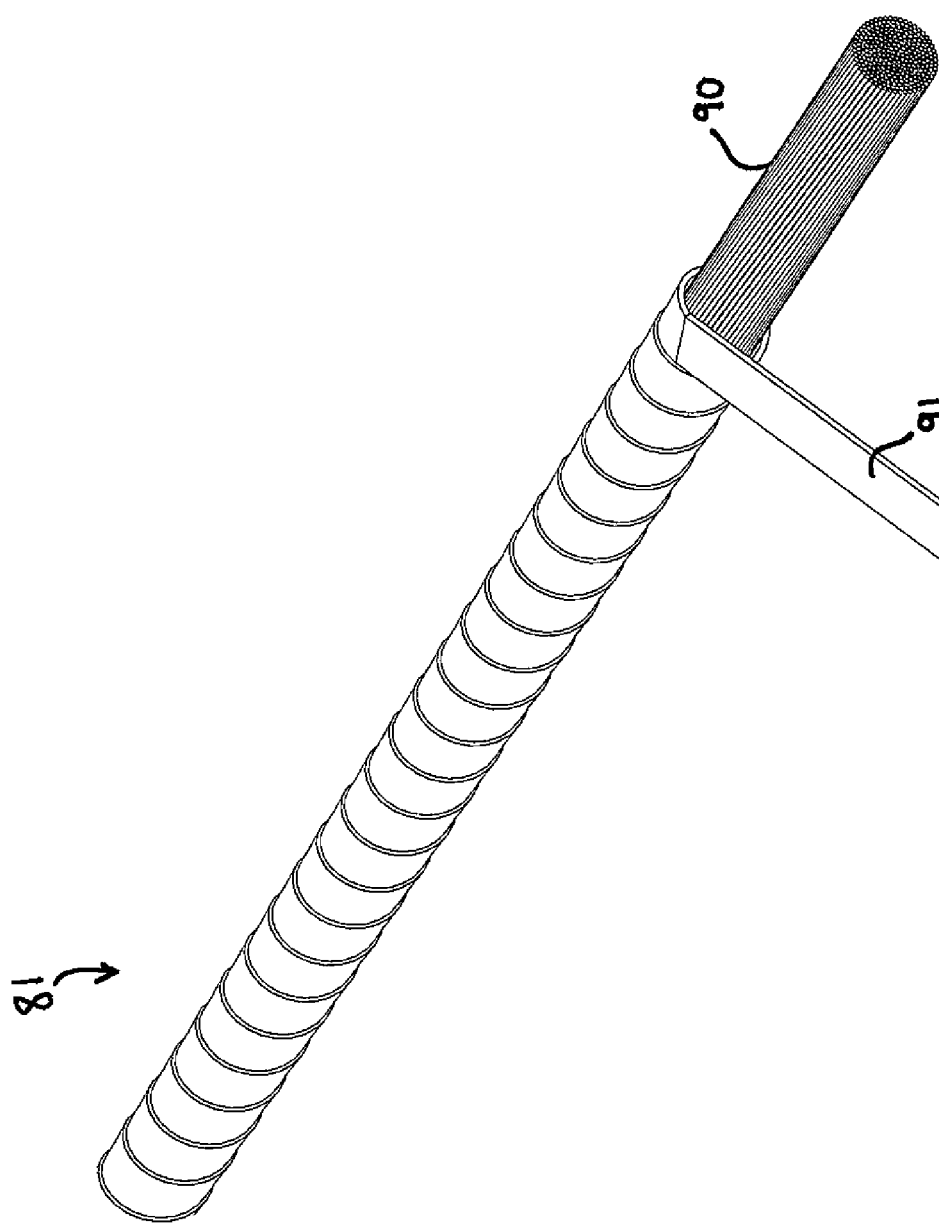
FIG. 8 is an isometric view of winding wire used in the rotating electric machine shown in FIG. 3.

An isometric view of winding wire used in the rotating electric machine of FIG. 3 in shown in FIG. 8. The windings 41 are located inside the magnetic airgap 60 and are subject to the varying magnetic flux from the permanent magnets 52 as the rotor 51 rotates. If the winding wire were constructed as a solid copper wire, it would result in unacceptably large eddy current losses. The windings 41 employed in slotless electrical machine 50 in accordance with the invention employ wire 81 that is comprised of individually insulated twisted strands 90 diametrically enveloped by an outer serve 91. The smaller diameter strands 90 are electrically in parallel but insulated from each other along their lengths particularly inside the magnetic airgap to preclude development of significant eddy current losses. The strands 90 are twisted or transposed to prevent circulating currents between the strands which would otherwise cause additional losses. The preferred strand gauge size for supporting low eddy current losses at common commercial speeds with a high pole count is typically in the range between 36-40 AWG. The strands 90 are preferably held together with an other serve 91 the provides handling durability during winding process. The serve 91 additionally holds the bundle of strands 90 together to the adhesive film 32. As a result, the adhesive film 32 holds the serve 91 to the helical stator backiron 35 and the serve 91 holds the strands 90 to the adhesive film 32. One preferred type of serve 91 that provides high toughness at low cost is the use of nylon fiber thread. Although other serve constructions such as a polyester or polyimide tape film can be utilized and provide advantages for different slotless electric machine design parameters, such as the wire size and voltage insulation requirements.

Figure 9:
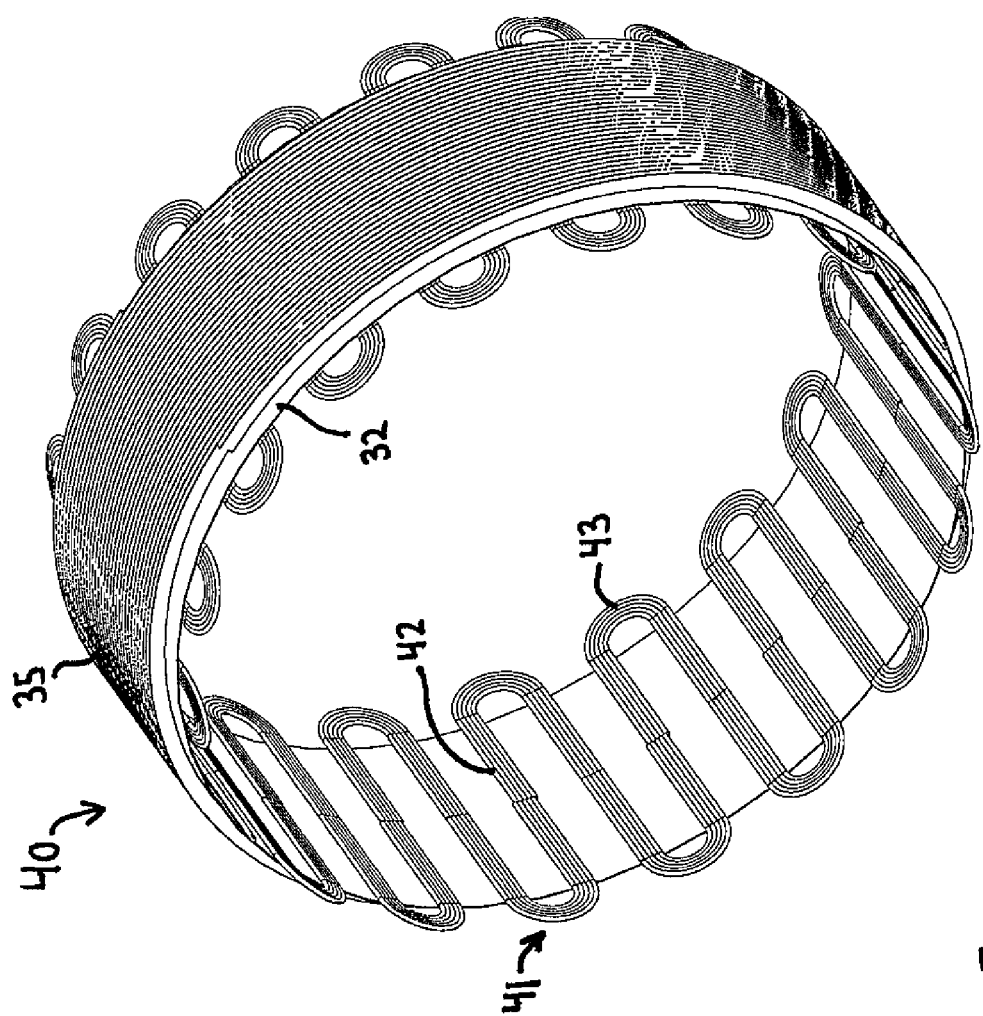
FIG. 9 is an isometric view of the partially wound stator used in the slotless rotating electric machine shown in FIG. 3.

An isometric view of the partially wound stator used in the slotless rotating electric machine of FIG. 3 is shown in FIG. 9. The stator 40 is comprised of a helical stator backiron 35 with a structural epoxy adhesive film 32 applied to the inner diameter. The adhesive film 32 is preferably pre-die cut to exact length to match the inner diameter of the of the stator backiron 35 and with length axially longer to provide form dielectric insulation from the axial edges of the of the stator backiron 35. The windings 41 comprise axial direction active lengths 42 bonded to the stator backiron 35 and end turns 43 that travel circumferentially to connect serial active lengths 42. The windings 41 are preferably formed as a serpentine pattern, although other winding patterns could alternatively be employed. Preferably, the windings 41 are formed onto the stator backiron 35 by traversing the winding pattern and sequentially applying pressure to the wire 81 against the adhesive film 32 while in a tacky state. The temperature of the adhesive film 32 is preferably maintained at a slightly elevated level above room temperature, typically 105-120° F. (41-49° C.), to provide for maximum tackiness for the adhesive to hold the winding pattern as formed. Although the preferred winding method is direct forming of the individual phase windings 41 onto the adhesive film 32, it is alternatively possible to pre-wind individual phase coils and then form the multiphase winding pattern directly on to the adhesive film 32 by adhering them individually. This method would require significant extra steps and a high number of electrical connections and therefore is not preferred.

It is desirable to minimize the radial magnetic airgap 60 between the stator backiron 35 and magnets 52 on the rotor 51 to increase the performance of the electric machine 50 per the amounts of active materials utilized. On such method to achieve this goal is by limiting the typical three phase windings to only a single layer. Accordingly, the armature windings 41 comprise an air core winding pattern formed directly onto the adhesive film 32 in a one wire radial layer that is only one wire deep where inside the magnetic airgap 60, and having end turns 43 of multiple phases overlapping outside of the magnetic airgap 60. In this configuration, all active lengths 42 occupy the same layer against the inner diameter of the stator backiron 35. Besides the benefits of high performance per amounts of copper and magnet utilized and high production-manufacturing compatibility, the windings 41 also achieve excellent thermal transmission for conducting resistive energy loss as heat to the stator backiron 35. Each wire 81 in the magnetic airgap 60 is in direct heat conduction to the adhesive film 32 and the adhesive film 32 is in direct heat conduction to the helical stator backiron 35. The thermal resistance between the stator windings 41 and the stator backiron 35 is very small and is limited to only one layer of the very thin thickness of the adhesive film 32.

Figure 10:
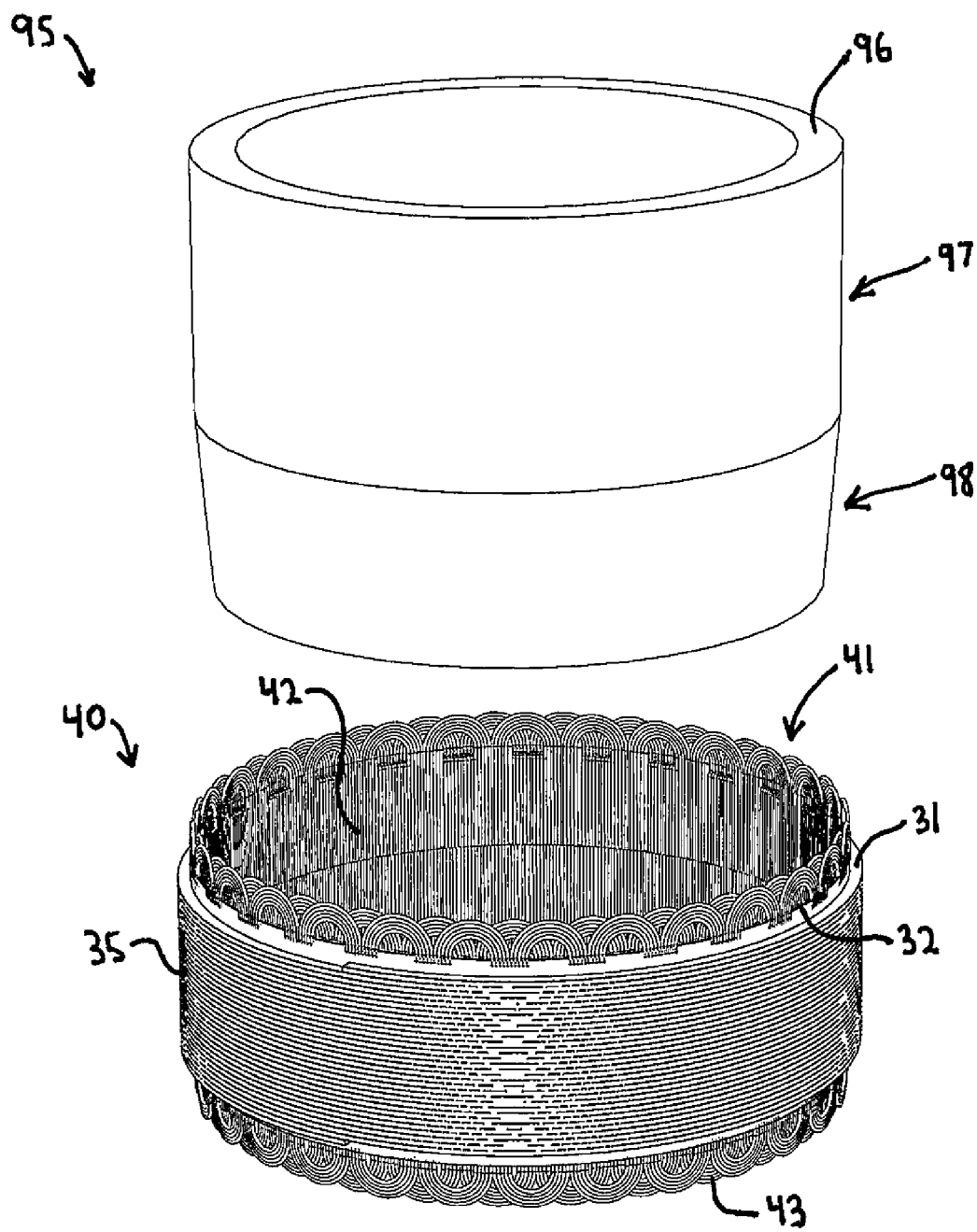
FIG. 10 is an isometric view of the stator curing process used for the slotless rotating electric machine shown in FIG. 3.

A schematic drawing of the stator curing process used for a slotless rotating electric machine of FIG. 3 is shown in FIG. 10. After completion of adhering all three phases of windings 41 to the radial airgap surface with the active lengths 42 running axially in a single layer and multiple phase end turns 43 running circumferentially and overlapping outside the magnetic airgap 60, the bond strength between the windings 41 and stator backiron 35 is increased. The adhesive film 32 is transitioned from B-stage to C-stage condition with the curing process 95. To prevent loss of the accurate winding pattern during the process 95, tooling 96 is applied to the stator 40. The tooling 96 comprises a cylinder with outer diameter that is slightly larger and applies radial pressure to the armature windings 41 against the stator backiron 35 when inserted and maintains radial pressure during the transition of the adhesive film from B-stage to C-stage condition. The tooling 96 may comprise any material that provides a desirable level of compression both at room temperature and at full curing temperature. For simplicity, the tooling 96 may comprise a thin steel ring with outer diameter set to provide the desired precompression at room temperature when inserted, and then maintains that same pressure as it thermally expands the same amount as the stator backiron. Alternatively, the tooling may comprise a high temperature plastic such as a fluoropolymer. The tooling 96 preferably has a straight section 97 for uniform compression against the windings 41 when fully inserted and a tapered section 98 that allows for easy insertion into the stator backiron 35.

Upon completion of the curing of the adhesive film, the tooling 96 is removed from the stator 40 and the windings 41 are secured to the stator backiron 35 with a high strength compatible for reliable operation of the electric machine 50. For adhesive film 3M Scotch-Weld AF 163-2K, a typical cure schedule comprises a temperature ramp up to and hold at 250° F. (121° C.) for one hour. In production of the new electric machines 50, many stators 40 may be wound with their windings 41 adhered to the stator backirons 35 having film adhesive 32 in the B-stage condition, and then a batch oven cure applied to transition all of them to C-stage condition at the same time.

For some applications it can be preferable to alternatively construct the slotless electric machine with an outer rotor and an internal stator. In the configuration, the radial pressure may be provided by wrapping an outer hoop-tensioned layer around the windings after wound to apply the required radial pressure prior for transitioning from B-stage to C-stage condition. The hoop-tensioned layer can be removed after the adhesive film is fully cured, or if sufficiently radially thin it could be left if place even after the windings are secured with adhesive film in C-stage condition.

Figure 11A:
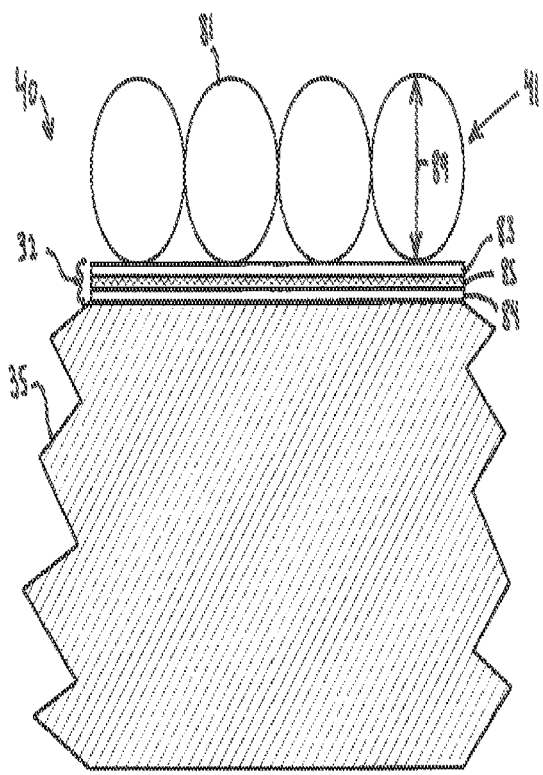
FIG. 11A is cross-sectional schematic drawing of an arc section of a slotless ferromagnetic stator showing armature windings when adhered to adhesive film in B-stage condition on the stator backiron in accordance with the invention.

A cross-sectional schematic drawing of an arc section of a slotless ferromagnetic stator showing armature windings when adhered to adhesive film in B-stage condition on the stator backiron in accordance with the invention is shown in FIG. 11A. The stator 40 comprises windings 41 of wires 81 that are adhered to adhesive film 32 in B-stage condition on the stator backiron 35. The adhesive film 32 has epoxy film inner and outer layers 83, 85 on each side with a middle knit fabric carrier 85. The epoxy adhesive on each side is approximately 0.003" (0.076 mm) thick and internal carrier has a thickness of approximately 0.004" (0.102 mm). The wires 81, when not compressed against the stator backiron 35, have a natural free diameter 89.

Figure 11B:
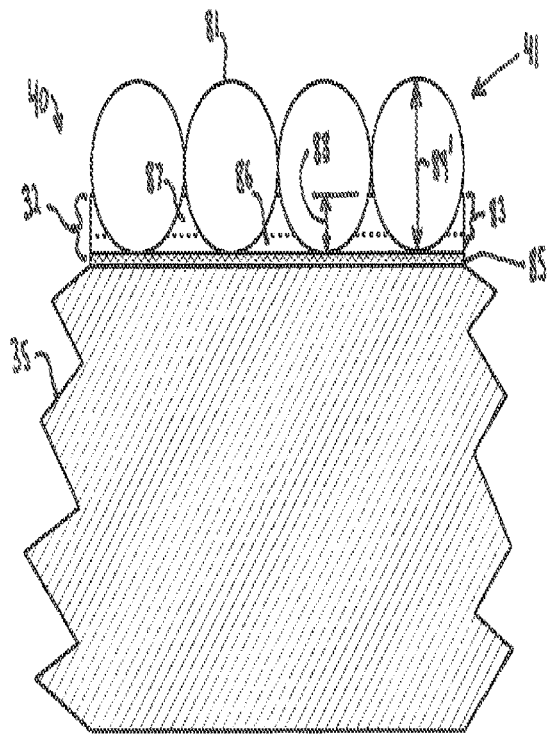
FIG. 11B is cross-sectional schematic drawing of an arc section of a slotless ferromagnetic stator showing armature windings when adhered to adhesive film in C-stage condition on the stator backiron in accordance with the invention.

A cross-sectional schematic drawing of an arc section of a slotless ferromagnetic stator showing armature windings when adhered to adhesive film in C-stage condition on the stator backiron in accordance with the invention is shown in FIG. 11B. The windings 41 are bonded to the stator backiron 35 with a high strength for reliable operation of the electric machine 50. Radial pressure was applied to the wires 81 using the tooling 96 while the adhesive film 32 was in the B-stage condition and the temperature was increased to transition the adhesive film to the C-stage condition. Upon completion of the cure, the tooling 96 was removed from the stator 40. During the transitioning of the adhesive film 32, the adhesive flowed partially up the sides of the wires 81 in the direction away from the helical stator backiron 35 and towards the rotor 51, not shown. The inner adhesive layer 83 may flow up an adhesive bond height 88 that is as much as 50% of the diameter of the wires 81 depending on the size of the wire and thickness of the adhesive film utilized. The carrier 85 maintains a minimum distance between the wires 81 and the stator backiron. Accordingly, the internal carrier 85 in the adhesive film 32 maintains a minimum dielectric strength between the wires 81 and stator backiron where located inside the magnetic airgap 60. With a thickness of the carrier 85 of approximately 0.004" (0.102 mm), this insures the minimum dielectric strength of about 7200 volts, on top of the insulation dielectric strength on the actual winding wires 81. During the curing transition, the wires 81 were radially compressed by the tooling 96 and the adhesive film flowed partially up the sides of the wires 81. We have found that the adhesive film 32 curing to the serve 91 with the wires 81 having a compressed diameter 89' in the direction of the radial pressure causes the wires 81 to remain in a compressed state from round after tooling 96 is removed. This provides an added benefit of reducing the radial thickness of the armature windings 41 inside the magnetic airgap 60. Thinner windings 41 allows for a reduction in the thickness of the magnetic airgap 60 and a resulting reduction in the required thickness of the magnets 52.

An isometric view of the complete wound and cured stator used in the slotless rotating electric machine of FIG. 3 is shown in FIG. 12. The stator 40 comprises the helical edge wound strip 31 that forms the stator backiron 35 with inner adhesive film 32 and windings 41. The active length portions 42 of the windings 41 are bonded to the stator backiron 35 with high strength as the adhesive film is in the C-stage condition and the tooling 96 has been removed. The end turns 43 are not bonded to the stator backiron and are located outside the magnetic airgap, with end turns of multiple phases overlapping. For the most efficient electrical machine design, the active lengths 42 run axially and multiple phases all occupy the same layer and are each adhered to the stator backiron 35, transferring force from the wires directly. Although, other configurations of windings 41 including helical patterns could also be employed but with less optimal performance. Upon curing, the windings 41 are widely unimpregnated where bonded (to be located inside the magnetic airgap 60), due to the limited amount of adhesive of the film 31 and also from the outer serve 91 restricting adhesive permeation. The end turns 43 are not in contact with the adhesive film 32, and as a result the wire 81 will comprise a porous bundle of strands 90 at those locations to be outside the magnetic airgap 60. It is possible to add an extra step of vacuum pressure impregnation or molding, however such steps are unnecessary and would undesirably add manufacturing time, cost and waste. As such the armature windings 41 are preferably unencapsulated by molded adhesive at locations inside magnetic airgap 60.

Figure 13:
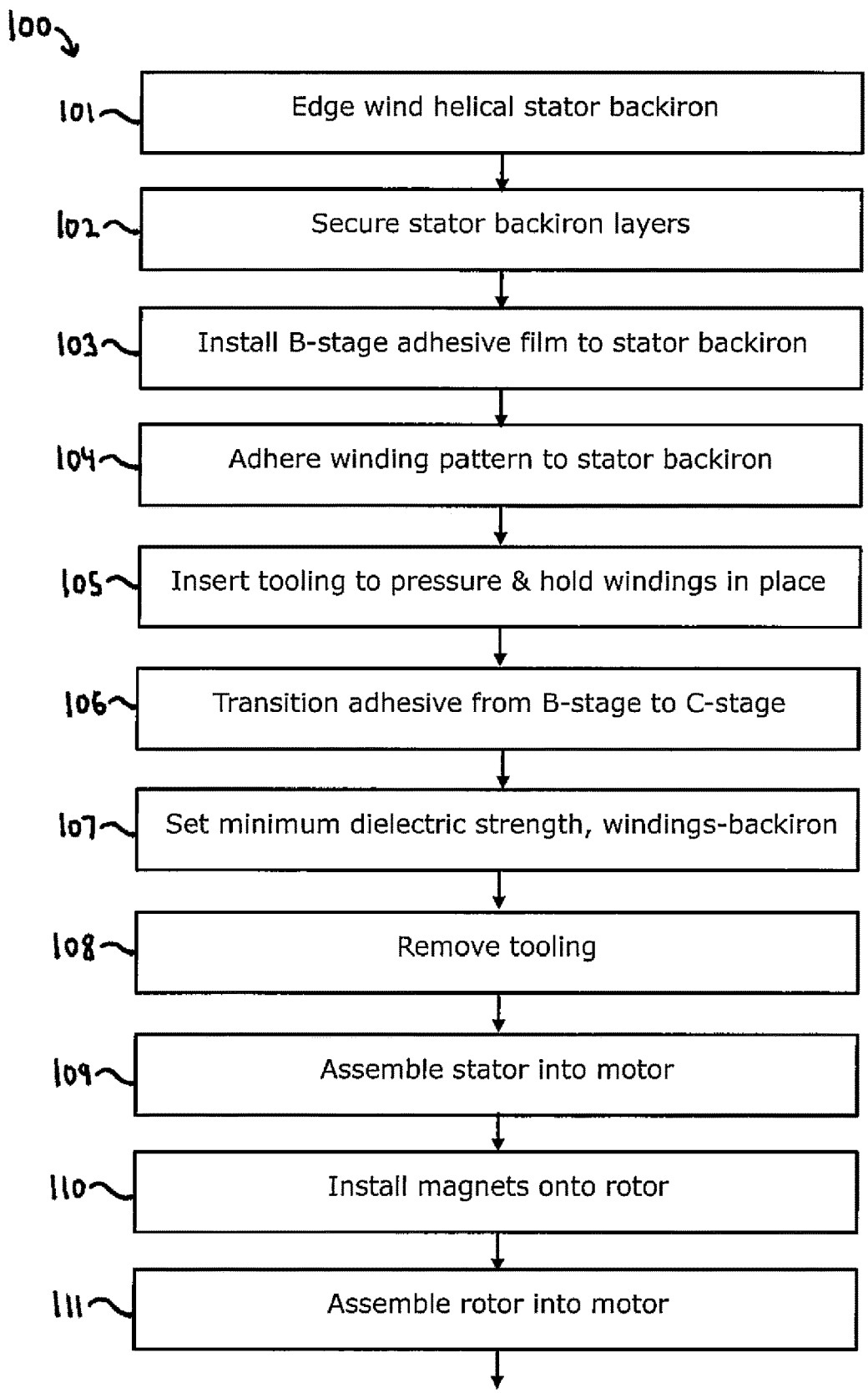
FIG. 13 is a process flow chart of a manufacturing method for use to produce slotless rotating electric machines in accordance with the invention.

A process flow chart of a manufacturing method for use to produce slotless rotating electric machines (motor) in accordance with the invention is shown in FIG. 13. The manufacturing process 100 starts with edge rolling ferromagnetic strip to form a slotless helical stator backiron. After edge roll forming, the layers of the stator backiron are secured together 102. This can be accomplished by adhesive bonding the helical strip into a unitary stator backiron, or by mechanical means. After the stator backiron manufacture is complete, B-stage adhesive film is installed 103 to the stator backiron. The winding pattern is adhered to the stator backiron 104. The windings are temporarily held in place. Tooling is inserted 105 to apply radial pressure to the windings against the stator backiron. The adhesive film is then transitioned from B-stage to C-stage condition 106 by increasing the temperature to cure the adhesive film. The radial pressure from the tooling prevents loss of the accurate winding pattern as the adhesive flows. During the transition, the internal carrier in the adhesive film prevents complete squeeze-out of the adhesive under the wires and sets the minimum dielectric strength 107 between the windings and the stator backiron. After curing, the tooling is then removed 108. The stator is assembled into the motor 109. The magnets are next installed to the rotor 110. The magnets are typically epoxy bonded to the radial surface of the rotor. The rotor is then installed into the motor 111 and the motor manufacturing is complete.

Figure 14A:
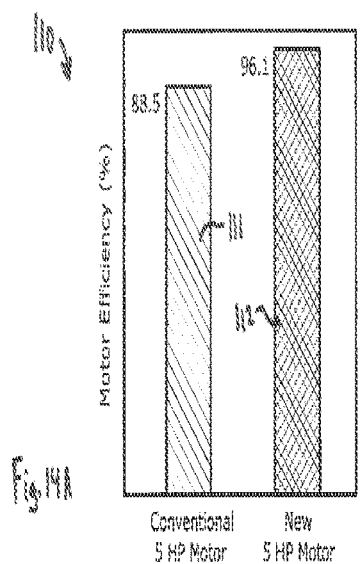
FIG. 14A is a comparison chart showing difference in efficiency between a conventional 5 hp motor and a slotless rotating electric machine in accordance with the invention.

A comparison chart showing difference in efficiency between a conventional 5 hp motor and a slotless rotating electric machine in accordance with the invention is shown in FIG. 14A. As shown in the comparison 110, a common conventional 5 hp (3.73 kW) 3600 rpm induction motor has a full load and speed efficiency of 88.5%. A new 5 hp (3.73 kW) 3600 rpm motor in accordance with the invention achieves a full load and speed efficiency of 96.1%. This exceeds the latest high efficiency standards.

Figure 14B:
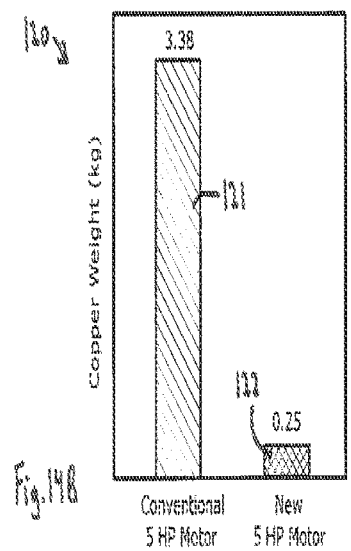
FIG. 14B is a comparison chart showing difference in copper weight between a conventional 5 hp motor and a slotless rotating electric machine in accordance with the invention.

A comparison chart showing difference in copper weight between a conventional 5 hp motor and a slotless rotating electric machine in accordance with the invention is shown in FIG. 14B. As shown in the comparison 120, a conventional 5 hp (3.73 kW) induction motor has a weight of copper windings of 7.44 lbs (3.38 kg). In contrast, a new 5 hp (3.73 kW) motor in accordance with the invention has a weight of copper windings of only 0.55 lbs (0.25 kg). This is a 92.6% reduction in the amount of copper required.

Figure 14C:
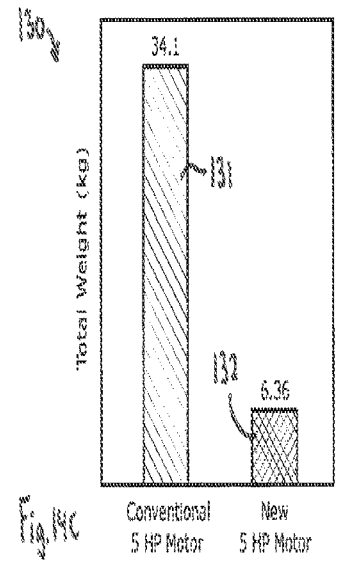
FIG. 14C is a comparison chart showing difference in total weight between a conventional 5 hp motor and a slotless rotating electric machine in accordance with the invention.

A comparison chart showing difference in total weight between a conventional 5 hp motor and a slotless rotating electric machine in accordance with the invention is shown in FIG. 14C. As shown in the comparison 130, a conventional 5 hp (3.73 LW) motor has a total weight of 75 lbs (34.1 kg). In contrast, a new 5 hp (3.73 kW) motor in accordance with the invention has a total weight of only 14 lbs (6.36 kg). This is a 81% reduction in the total weight of the motor.

A table of materials use and manufacturing waste for producing slotless rotating electric machines in accordance with the invention is shown in FIG. 15. The table 140 illustrates the benefits on the new electric machines based on the components 141 for material usage 142, manufacturing waste 143 and the origins of the attributes 144. The ferromagnetic stator 145 has minimum material usage and near zero manufacturing waste. There are several reasons for this including the high pole count that allows the stator backiron to be radially thinner for low material usage. The lack of slot cutting for pole teeth reduces the material usage and manufacturing waste. Because the stator backiron is formed from edge rolling strip into a helical form, there is no lamination stamping waste. Likewise, the ferromagnetic strip is simply cut and rolling stopped when the helical stator backiron reaches the desired length.

The windings wire has both minimum material usage and near zero waste. The windings occupying only a single radial layer in the magnetic airgap reduces the length of the windings required compared to multi-layer slotless armature configurations. The end turns are also located outside of the magnetic airgap and the winding wire is simply cut to length after completing the winding process.

The stator adhesive has minimum material usage and near zero manufacturing waste. No potting of the windings or vacuum pressure impregnation of the windings is used. By contrast, the adhesive film is typically only 0.010" (0.25 mm) thick, or enough to strongly bond the windings to the stator backiron for reliable operation of the electric machine. Waste is further precluded as the adhesive film is provided die cut to the exact backiron dimensions required.

The ferromagnetic rotor has minimum material usage and very low manufacturing waste. The high pole count of the electric machines allows the rotor backiron section to be made much thinner while still effectively conduction magnetic flux between adjacent magnet poles. This greatly reduces the material usage. The rotor may also be made from cast steel produced to a near net shape, reducing the manufacturing waste. Only final machining is required from the casting.

The rotor magnets have minimum material usage and near zero manufacturing waste. The winding structure of the new electric machines minimizes the required magnetic airgap. The smaller the thickness of the magnetic airgap, the thinner the required magnets can be for driving magnetic flux at a given flux density across the magnetic airgap. Permanent magnets such as NdFeB type are typically produced to the shape required and the machining waste recycled.

Figure 16:
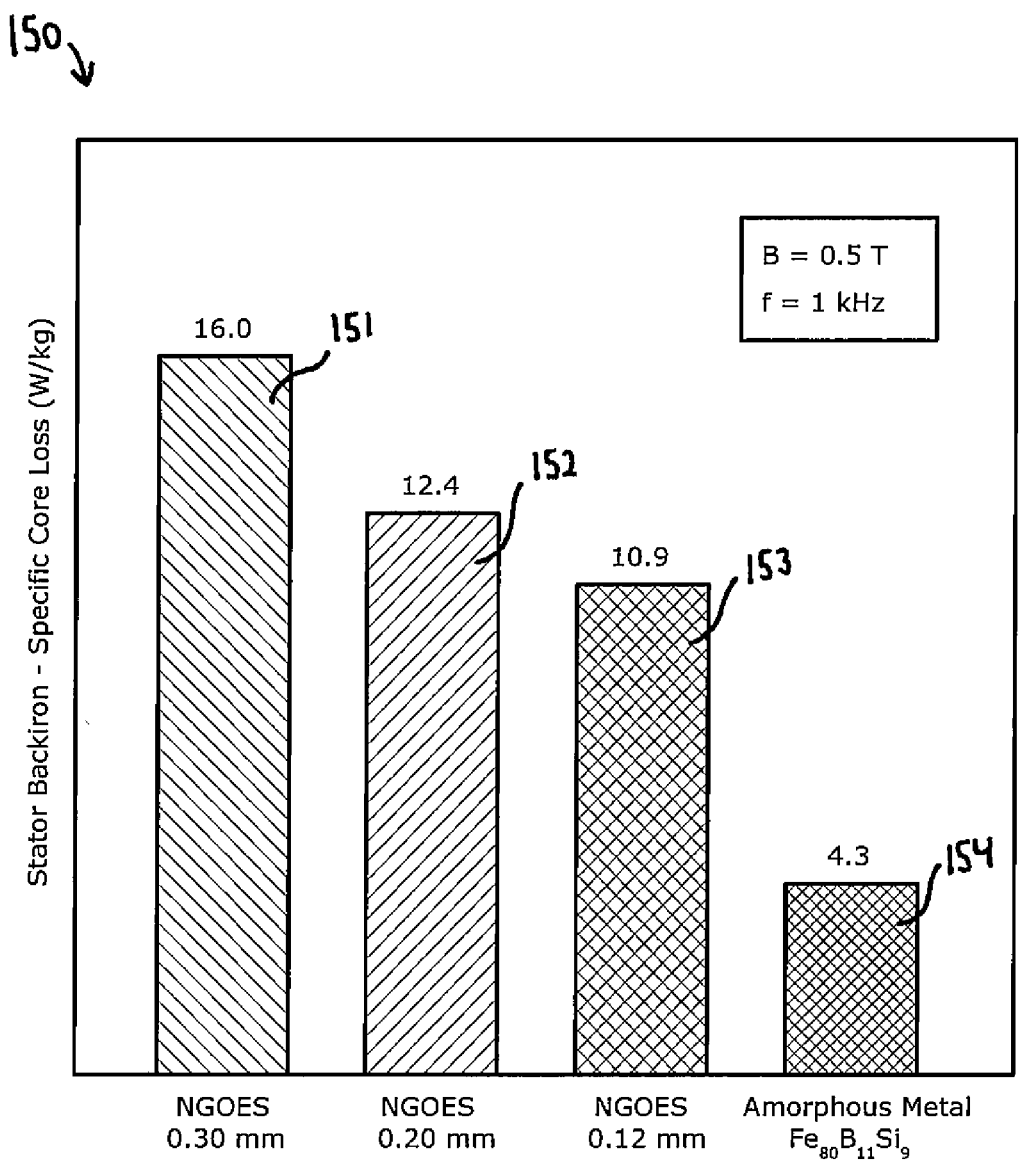
FIG. 16 is a comparison chart showing specific core losses for different stator backiron constructions and materials in accordance with the invention.

FIG. 16 is a comparison chart showing specific core losses for different stator backiron constructions and materials in accordance with the invention. The comparison shows 150 shows the stator backiron specific core losses for different materials when operating at 0.5 T and 1 kHz. For 0.012" (0.30 mm) thickness non-grain oriented electrical steel 151, the specific core losses in the stator backiron are 16 W/kg. The thinner the lamination strip or layers of the helical wound stator backiron, the lower the core losses due to a reduction in the eddy current losses. For 0.008" (0.20 mm) thickness non-grain oriented electrical steel 152, the specific core losses in the stator backiron drop to 12.4 W/kg. For 0.005" (0.12 mm) thickness non-grain oriented electrical steel 153, the specific core losses in the stator backiron drop even further to 10.9 W/kg. The hysteresis losses remain essentially constant regardless of the thickness of the stator laminations so utilizing thinner laminations of the same non-grain oriented electrical steel to reduce core losses starts to have diminishing returns. If there is a desire to obtain even lower core losses for the higher efficiency electric machines, the hysteresis losses must also be reduced along with the eddy current losses. One material that accomplishes this is amorphous metal also known as metallic glass. One type of amorphous metal well-suited for stator backirons for the new slotless electric machines by having low losses with low costs, are compounds of iron, boron and silicon. For helical wound stator backirons made of $Fe_{80}B_{11}Si_9$ 154, the specific core losses drop to only 4.3 W/kg. This material is typically producible in maximum thicknesses of only 0.001-0.002" (0.025-0.050 mm), so it would require more turns of the edge wound strip to achieve the helical edge wound stator of the desired length. Cost for this material is currently only about 10% higher than grain oriented silicon steel. Other materials could be used for the stator backirons as well, as long as they provide low core losses at the desired operating frequency and flux density of the slotless electric machine.

Obviously, numerous modifications and variations of the described preferred embodiment are possible and will occur to those skilled in the art in light of this disclosure of the invention.

Accordingly, I intend that these modifications and variations, and the equivalents thereof, be included within the spirit and scope of the invention as defined in the following claims, wherein We claim:

1. A slotless rotating electric machine comprising:
   a rotor having multiple alternating polarity permanent magnets that drive magnetic flux back and forth across a magnetic airgap formed with a radial airgap surface of a slotless ferromagnetic stator;
   said slotless ferromagnetic stator comprising a helical stator backiron formed from a ferromagnetic strip wound edgewise and extending axially and an adhesive film on said radial airgap surface of said helical stator backiron;
   armature windings of wire adhered to said adhesive film on said radial airgap surface wherein said wire comprises individually insulated twisted strands diametrically enveloped by an outer serve;
   said adhesive film holding said serve to said helical stator backiron with said serve holding said strands to said adhesive film;
   said armature windings comprising an air core winding pattern formed directly onto said adhesive film in a one wire radial layer that is only one wire deep where inside said magnetic airgap, and having end turns of multiple phases overlapping,
   said armature windings pressed into said adhesive film as a group after formed and adhered while said adhesive film cures, such that said wire is both bonded to said radial airgap surface of said helical stator backiron and is additionally partially embedded in said adhesive film.

2. The slotless rotating electric machine as described in claim 1 wherein: said slotless ferromagnetic stator is adapted to hold said armature windings in said air core winding pattern onto said helical stator backiron by adhesion to said adhesive film in B-stage condition when said air core winding pattern is formed, by applied radial pressure to said armature windings against said helical stator backiron while during transition of said adhesive film from said B-stage condition to C-stage condition, and by adhesion to said adhesive film in said C-stage condition in operation of said slotless rotating electric machine.

3. The slotless rotating electric machine as described in claim 1 wherein: said adhesive film is flowed partially up sides of said wire in a direction away from said helical stator backiron and towards said rotor where located inside said magnetic airgap.

4. The slotless rotating electric machine as described in claim 1 wherein: said adhesive film comprises an internal carrier that maintains a minimum dielectric strength between said wires and said helical stator backiron where located in said magnetic airgap.

5. The slotless rotating electric machine as described in claim 1 wherein: said carrier comprises a fabric.

6. The slotless rotating electric machine as described in claim 1 wherein: each said wire in said magnetic airgap is in direct heat conduction to said adhesive film and said adhesive film is in direct heat conduction to said helical stator backiron.

7. The slotless rotating electric machine as described in claim 1 wherein: said strands of said wire are widely unimpregnated in locations inside said magnetic airgap.

8. The slotless rotating electric machine comprising: a rotor having multiple alternating polarity permanent magnets that drive magnetic flux back and forth across a magnetic airgap formed with an airgap surface of a slotless ferromagnetic stator;
said slotless ferromagnetic stator comprising a stator backiron ring formed from ferromagnetic material and an adhesive film on said airgap surface of said stator backiron ring;
armature windings of wire adhered to said adhesive film on said airgap surface wherein said wire comprises individually insulated twisted strands;
said armature windings comprising an air core winding pattern formed directly onto said adhesive film;
said armature windings pressured against said stator backiron ring as a group after formed and adhered with heat, imparting said armature windings to be secured in said air core winding pattern formed on said airgap surface, and additionally with said adhesive film flowed partially up a sides of said wire in a direction away from said stator backiron ring and towards said rotor at locations inside said magnetic airgap;
said adhesive film providing increased resistance to force on said armature windings.

9. The slotless rotating electric machine as described in claim 8 wherein: said slotless ferromagnetic stator is adapted to hold said armature windings in said air core winding pattern onto said stator backiron ring by adhesion to said adhesive film in B-stage condition when said air core winding pattern is formed, by applied pressure to said armature windings against said stator backiron while during transition of said adhesive film from said B-stage condition to C-stage condition, and by adhesion to said adhesive film in said C-stage condition in operation of said slotless rotating electric machine.

10. The slotless rotating electric machine as described in claim 8 wherein: said pressure is applied prior to said adhesive film reaching the maximum curing temperature during said transition to said C-stage condition.

11. The slotless rotating electric machine as described in claim 8 wherein: said armature windings are unencapsulated by molded adhesive at locations inside said magnetic airgap.

12. The slotless rotating electric machine as described in claim 8 wherein: said stator backiron ring is formed of a ferromagnetic strip wound edgewise and extending axially in a helix wherein said adhesive film is applied to said radial airgap surface comprising the edges of said strip.

13. The slotless rotating electric machine as described in claim 8 wherein:
said wire comprises a serve of dielectric material helically wrapped around said strands wherein said adhesive film holds said wire to said stator backiron ring and said serve holds said strands to said adhesive film.

14. The slotless rotating electric machine as described in claim 8 wherein: said adhesive film comprises an internal carrier that maintains a minimum dielectric strength between said wires and said stator backiron ring where located in said magnetic airgap after said adhesive film is cured to said C-stage condition.

15. A slotless rotating electric machine comprising: a rotor having multiple poles that drive magnetic flux across a magnetic airgap formed with a radial airgap surface of a slotless ferromagnetic stator;
a slotless ferromagnetic stator formed as a helical stator backiron of a ferromagnetic strip wound edgewise and extending axially;
an adhesive film on said radial airgap surface of said helical stator backiron;
armature windings of wire adhered to said adhesive film on said radial airgap surface wherein said wire comprises individually insulated twisted strands diametrically enveloped by an outer serve;
said adhesive film holding said serve to said helical stator backiron with said serve holding said strands to said adhesive film;
said armature windings applied in an air core winding pattern onto said adhesive film in a one wire radial layer that is only one wire deep where inside said magnetic airgap, and with end turns of multiple phases overlapping;
said air core winding pattern secured to said helical stator backiron on said radial airgap surface and additionally by said adhesive film flowed partially up the sides of said wire in a direction away from said helical stator backiron and towards said rotor at locations inside said magnetic airgap, not including the side of said wire facing the rotor opposite said radial airgap surface of said helical stator backiron;
said flowed adhesive imparting increased resistance to force on said armature windings.

16. The slotless rotating electric machine as described in claim 15 wherein:
said adhesive film is adapted to hold said armature windings in said air core winding pattern while in B-stage condition, and said helical stator backiron is adapted to maintain said winding pattern through applied radial pressure to said armature windings against said helical stator backiron during transition of said adhesive film from said B-stage condition to C-stage condition.

17. The slotless rotating electric machine as described in claim 15 wherein: said adhesive film comprises an internal carrier that maintains a minimum dielectric strength between said wires and said helical stator backiron where located in said magnetic airgap.

18. The slotless rotating electric machine as described in claim 17 wherein: said carrier comprises a fabric.

19. The slotless rotating electric machine as described in claim 15 wherein: said wire comprises a porous bundle of strands at locations outside said magnetic airgap.

20. The slotless rotating electric machine as described in claim 15 wherein: said adhesive film flow partially up the sides of said wire and cured to said serve holds said wire in a compressed state from round, imparting a reduced radial thickness of said armature windings inside said magnetic airgap.

* * * * *